United States Patent
Szabo et al.

(10) Patent No.: US 9,944,412 B2
(45) Date of Patent: Apr. 17, 2018

(54) SPACECRAFT SYSTEM FOR DEBRIS DISPOSAL AND OTHER OPERATIONS AND METHODS PERTAINING TO THE SAME

(71) Applicant: Busek Co., Inc., Natick, MA (US)

(72) Inventors: James J. Szabo, Bedford, MA (US);
Vladimir Hruby, Newton, MA (US);
Thomas R. Roy, Maynard, MA (US);
Craig DeLuccia, Natick, MA (US); Jay Andrews, Templeton, MA (US); W. Dan Williams, Botlon, MA (US);
Matthew R. Berlin, Cambridge, MA (US); Jesse V. Gray, Somerville, MA (US)

(73) Assignee: Busek Co., Inc., Natick, MA (US)

( * ) Notice: Subject to any disclaimer, the term of this patent is extended or adjusted under 35 U.S.C. 154(b) by 788 days.

(21) Appl. No.: 14/505,678

(22) Filed: Oct. 3, 2014

(65) Prior Publication Data
US 2015/0097084 A1  Apr. 9, 2015

Related U.S. Application Data

(60) Provisional application No. 61/886,816, filed on Oct. 4, 2013.

(51) Int. Cl.
*B64G 1/10* (2006.01)
*B64G 1/26* (2006.01)
(Continued)

(52) U.S. Cl.
CPC ............ *B64G 1/1078* (2013.01); *B64G 1/26* (2013.01); *B64G 1/36* (2013.01); *B64G 1/646* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,421,540 A | * | 6/1995 | Ting | B64G 1/1078 244/158.1 |
| 5,806,802 A | * | 9/1998 | Scott | B64G 1/1078 244/172.4 |

(Continued)

OTHER PUBLICATIONS

Jerome Grosse, EPFL Spokesperson, Cleaning Up Earth's Orbit: A Swiss Satellite Tackles Space Junk; http://actu.epfl.ch/news/cleaning-up-earth-s-orbit-a-swiss-satellite-t. . . , Feb. 15, 2012, four (4) pages.

(Continued)

*Primary Examiner* — Christopher P Ellis
(74) *Attorney, Agent, or Firm* — Iandiorio Teska & Coleman, LLP

(57) ABSTRACT

A spacecraft system and method includes a platform with a dock and an umbilical payout device. A robot is connected to an umbilical paid out by the umbilical payout device and is repeatedly deployable from the dock. The robot includes one or more imagers, an inertial measurement unit, and a plurality of thrusters. A command module receives image data from the one or more robot imagers and orientation data from the inertial measurement unit. An object recognition module is configured to recognize one or more objects from the received image data. The command module determines the robot's orientation with respect to an object and issues thruster control commands to control movement of the robot based on the robot's orientation. The combination of the space platform and robot on umbilical line can be used for towing another object to different orbital location, inspection including self-inspection of the robot carrying platform and for robotic servicing.

31 Claims, 36 Drawing Sheets

(51) Int. Cl.
*B64G 1/36* (2006.01)
*B64G 1/64* (2006.01)
*B64G 4/00* (2006.01)
B64G 1/24 (2006.01)
B64G 1/40 (2006.01)
B64G 1/42 (2006.01)

(52) U.S. Cl.
CPC ............... *B64G 4/00* (2013.01); *B64G 1/242* (2013.01); *B64G 1/402* (2013.01); *B64G 1/405* (2013.01); *B64G 1/428* (2013.01); *B64G 1/648* (2013.01); *B64G 2004/005* (2013.01); *Y10S 901/09* (2013.01); *Y10S 901/47* (2013.01)

(56) References Cited

U.S. PATENT DOCUMENTS

| | | | |
|---|---|---|---|
| 6,275,751 B1* | 8/2001 | Stallard | B64G 1/646 244/164 |
| 7,207,525 B2* | 4/2007 | Bischof | B25J 15/10 244/158.2 |
| 7,438,264 B2 | 10/2008 | Cepollina et al. | |
| 9,434,485 B1* | 9/2016 | Lehocki | B64G 1/22 |
| 9,463,883 B2* | 10/2016 | Bigelow | B64G 1/646 |
| 2004/0031885 A1* | 2/2004 | D'Ausilio | B64G 1/1078 244/172.5 |
| 2006/0151671 A1 | 7/2006 | Kosmas | |
| 2007/0125910 A1* | 6/2007 | Cepollina | B64G 1/007 244/172.6 |
| 2011/0121139 A1* | 5/2011 | Poulos | B64G 1/646 244/169 |
| 2012/0175466 A1 | 7/2012 | Gregory et al. | |
| 2012/0286098 A1 | 11/2012 | Poulos | |
| 2012/0286100 A1 | 11/2012 | Knirsch | |
| 2014/0107865 A1* | 4/2014 | Griffith, Sr. | G05D 1/00 701/2 |
| 2015/0314893 A1* | 11/2015 | Rembala | B64G 1/646 244/172.5 |

OTHER PUBLICATIONS

Woo et al., Kinematics and Dynamics of Tethered Space Manipulators, Department of Mechanical Engineering, McGill University, eight (8) pages.

Peter B. de Selding, Space News Intelsat 19 Satellite Fails to Deploy Solar Array, Jun., 2, 2012, http://www.spacenews.com/article/intelsat-19-satellite-fails-deplo-solar-array, three (3) pages.

Space Tether Missions—Wikipedia, the Free Encyclopedia, http://en.wikipedia.org/wiki/Space_tether_missions, twelve (12) pages, May 6, 2013.

Aldoma et al., Point Cloud Library, Three-Dimensional Object Recognition and 6 DoF Pose Estimation, Sep. 10, 2012, IEEE Robotics & Automation Magazine, pp. 80-91.

Nohmi et al., Technical Verification Satellite "STARS" for Tethered Space Robot, Kagawa University, six (6) pages, 2008.

* cited by examiner

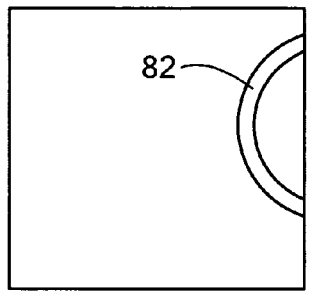 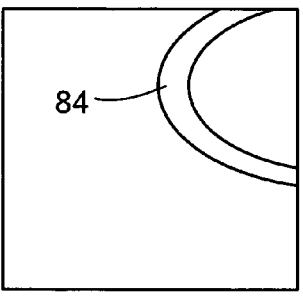 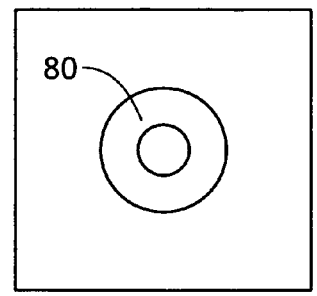
*FIG. 6A*   *FIG. 6B*   *FIG. 6C*
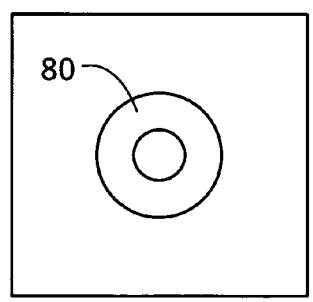
*FIG. 7*

StreamIntegrator - (combine 1 DDS and multiple ADS streams into one estimate)

Fields:
baseEstimate
baseEstimateTime
filter_constant_ads1
filter_constant_ads2
....

getEstimate(interval, estimateAtIntervalStart, (orientation)):
    //orientation is optional
    ta = interval_start
    tb = min(nextTimeBoundary(ta), interval_end)
    e = estAtIntervalStart
    repeat:
        relative_motion = DDS motion over ta to tb
        if orientation is provided, rotate relative_motion
        e = e + relative_motion
        for each ADS_i (i from 1 to num_ADS):
            if ADS_i has data d at tb:
                e = e ki + d (1-ki) //using filter constant ki
        ta = tb, tb = min(nextTimeBoundary(ta), interval_end)
    until ta == tb
    return e nextTimeBoundaryAfter(t):
    return first DDS_start,
    DDS_end, or ADS_sample_time
    occuring after t

*FIG. 28*

Update:
   set new BT to (current-time - H)
   Get estimates at time (BT)
   Reset all integrators to have those estimates as baseEstimate,
       and set their baseEstimateTimes to new BT
   Delete all DDS/ADS data older than BT
*FIG. 32*
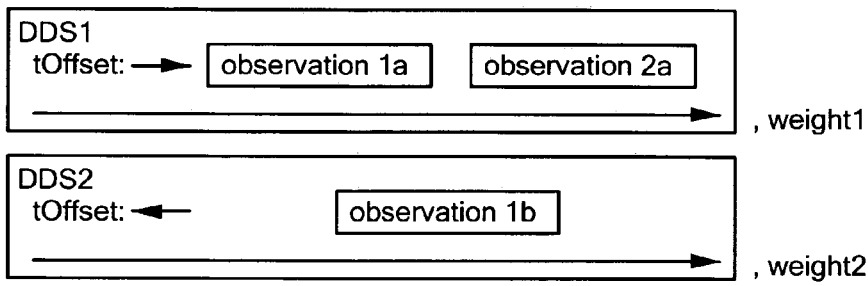
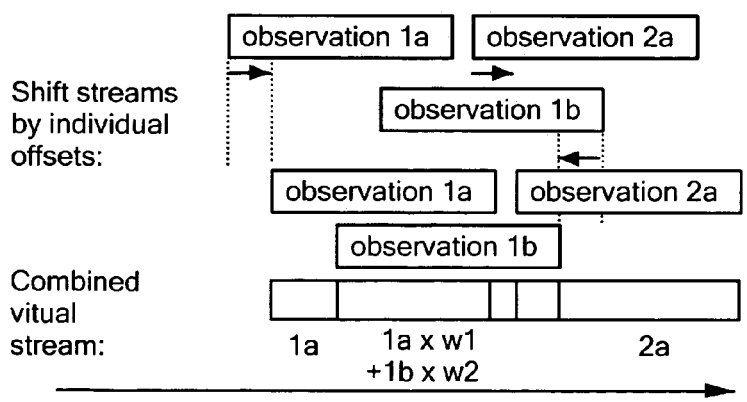
*FIG. 33*

SPACECRAFT SYSTEM FOR DEBRIS DISPOSAL AND OTHER OPERATIONS AND METHODS PERTAINING TO THE SAME

RELATED APPLICATIONS

This application claims benefit of and priority to U.S. Provisional Application Ser. No. 61/886,816 filed Oct. 4, 2013 under 35 U.S.C. §§ 119, 120, 363, 365, and 37 C.F.R. § 1.55 and § 1.78 incorporated herein by this reference.

GOVERNMENT RIGHTS

This invention was made with U.S. Government support under Contract Nos. FA9453-10-M-0187 and FA9453-11-C-0195 funded by the Office of Naval Research (ONR), SPAWAR and managed by the U.S. Air Force. The Government may have certain rights in the invention.

FIELD OF THE INVENTION

This invention relates to space debris retrieval and spacecraft inspection.

BACKGROUND OF THE INVENTION

Various proposals have attempted to address the space debris problem. See published U.S. Patent Application Nos. 2012/0286098; 2012/0286100; and 2012/0175466 and U.S. Pat. No. 5,421,540 all incorporated herein by this reference. In U.S. Pat. No. 7,207,525, incorporated herein by this reference, a free-flying grasper unit is tethered to an orbital platform (e.g., a satellite) and used to grasp a target object. The grasper unit includes cameras which transmit images back to a ground control station with a human operator. The human operator then transmits control commands to the grasper unit via the orbital platform.

Problems with such a proposal include the fact that communication delays and/or interruptions between the ground control station and the orbital platform might result in a grasper unit failing to grasp a target object and/or striking the target object damaging it and/or its components, possibly causing additional space debris, or damaging the grasper unit and/or the orbital platform. If the object to be grasped is an expensive satellite, the satellite could be damaged.

SUMMARY OF THE INVENTION

It might be a goal of some missions to position a camera closer to a satellite and/or other spacecraft for inspection purposes. In one example, it is well known that the solar arrays of satellites sometimes fail to fully deploy in space. Without knowing the failure mechanism, it can be very difficult to troubleshoot such failures. See http://www.space-news.com/article/intelsat-19-Satellite-Fails-Deploy-Solar-Array incorporated herein by this reference.

In aspects of the invention, a tethered robot is able to a) locate an object in space and even locate a component of such an object (e.g., a thruster, or solar array hinge) and provide images of the object or component to ground control, b) grasp and tow an object such as space debris or another satellite stranded in an incorrect orbit, and c) provide other operations ranging from simple functions such as illumination of an object for other robots to service to more complicated tasks such as refueling. In one example, the robot is stowed inside a larger spacecraft (mother ship) until it is called upon to inspect it. It is then deployed while tethered to the larger satellite and used to inspect components of the larger satellite itself. The possibility of damaging the satellite is minimal since the robot has low mass and concomitantly low momentum and since no commands from ground control are required in order for the robot to locate a satellite component and move towards it for imaging and inspection.

Featured is a spacecraft system comprising a platform including a dock and an umbilical payout device and a robot connected to an umbilical paid out by the umbilical payout device and deployable from the dock. The robot preferably includes one or more imagers, an inertial measurement unit, and a plurality of thrusters. A command module receives image data from the one or more robot imagers and orientation data from the inertial measurement unit. An object recognition module is configured to recognize one or more objects from the received image data. The command module determines the robot's orientation with respect to an object and issues thruster control commands to control movement of the robot based on the robot's orientation. Preferably, the command module is onboard the platform and image data and orientation data is transmitted from the robot to the platform via the umbilical. Thruster control commands are transmitted from the platform to the robot via the umbilical.

In some examples, the platform is a satellite. The robot may further include an end effector and/or a probe.

The command module may be configured with algorithms configured to issue thruster control commands which move the robot closer to said object and/or to issue thruster control commands which reposition the robot at a previously determined location. The object recognition module may be configured to recognize one or more objects based on stored image data. In one example the object recognition module includes a marker based tracking module and/or a point cloud based module. The one or more imagers may include a depth camera, an infrared camera, and/or an RGB camera.

Preferably, the command module is configured with a path planning module and path execution module configured to plan and execute movement of the robot. In one example, the path planning module is configured to plan a path which keeps the robot at a specific orientation with respect to the object. In another example the path planning module is configured to plan a path which keeps the robot at a specified distance from the object. In still another example, the path planning module is configured to plan a path of movement for the robot based on both image data and orientation data from the inertial measurement unit.

The system may further include means for damping the umbilical.

Also featured is a method comprising deploying a robot from a platform dock in space using an umbilical wound about an umbilical payout device associated with the dock. At the robot, image data and orientation data is generated. The image data is processed to recognize one or more objects imaged by the robot. The orientation data is processed to determine the robot's orientation with respect to a recognized object. Thruster control commands are issued to control movement of the robot based on the image and orientation data.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIGS. 6A-6C are images showing image data captured by a robot being controlled by the command module;

FIG. 7 is a view of a stored image used by the command module for various object recognition algorithms and robot control;

FIG. 28 shows the programming associated with stream integrators combining delta data streams and absolute data streams into single estimate;

FIG. 32 shows the programming associated with updating integrators and deleting old data from buffers;

FIG. 33 shows a combined delta data stream computed a weighed synthesis of two delta data streams;

DETAILED DESCRIPTION OF THE INVENTION

Figure 1:
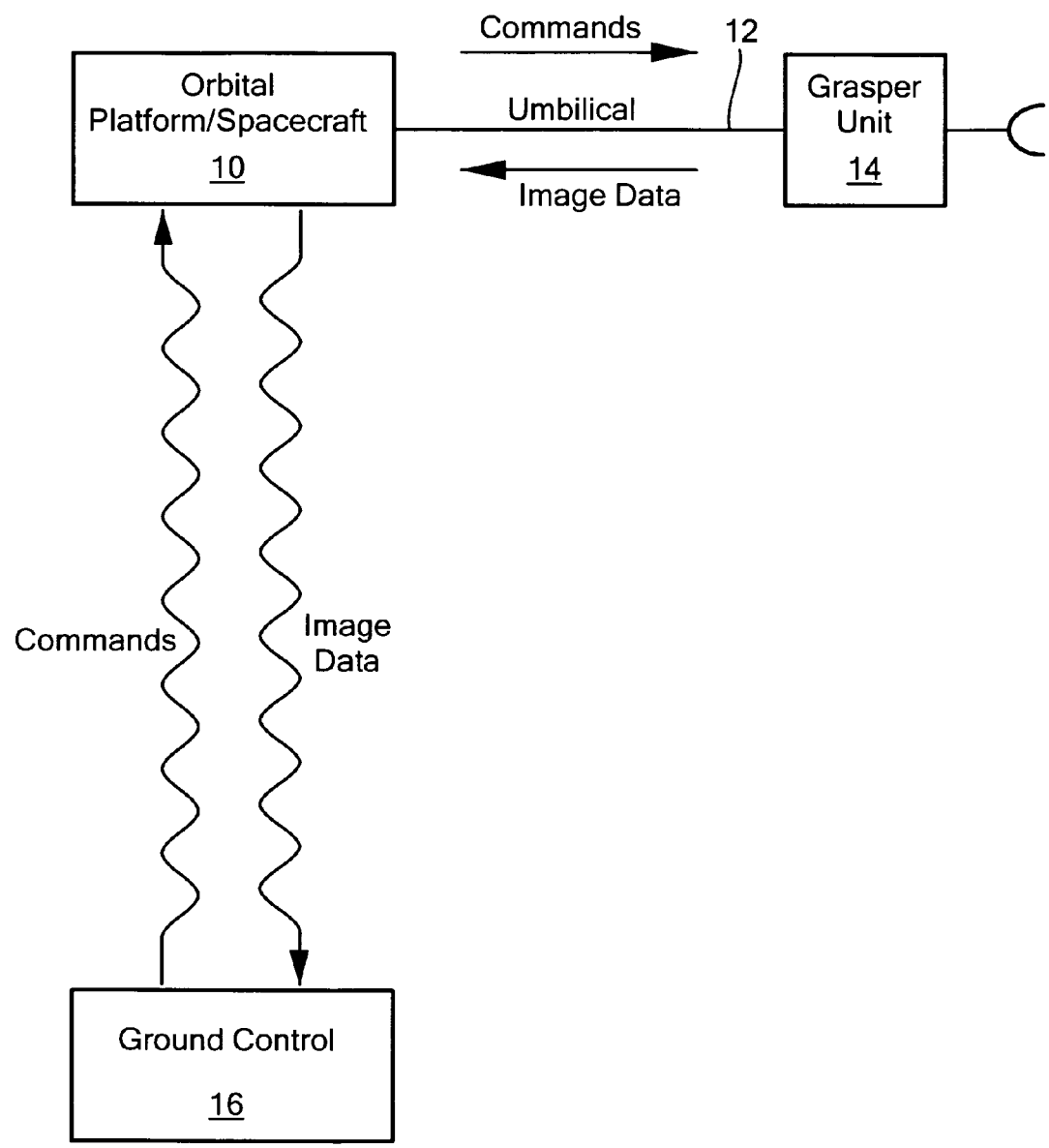
FIG. 1 is schematic block diagram showing a prior art orbital platform and grasper unit.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows a prior art system (see for example, U.S. Pat. No. 7,207,525 incorporated herein by this reference) where an orbital platform 10 pays out umbilical 12 attached to grasper unit 14. Images acquired by grasper unit 14 are transmitted via orbital platform 10 to manned ground control systems 16 which issued control commands to grasper unit 14 via platform 10 to, for example, maneuver grasper unit 14 proximate a target. Due to the long distance between ground control system 16 and orbital platform 10, communication delays and/or interrupts can render the control of grasper unit 14 difficult and/or imprecise.

If, for example, grasper unit 14 is proximate an expensive satellite, it is possible that grasper unit 14 could damage the satellite or one of its components due to a communications fault.

Figure 2:
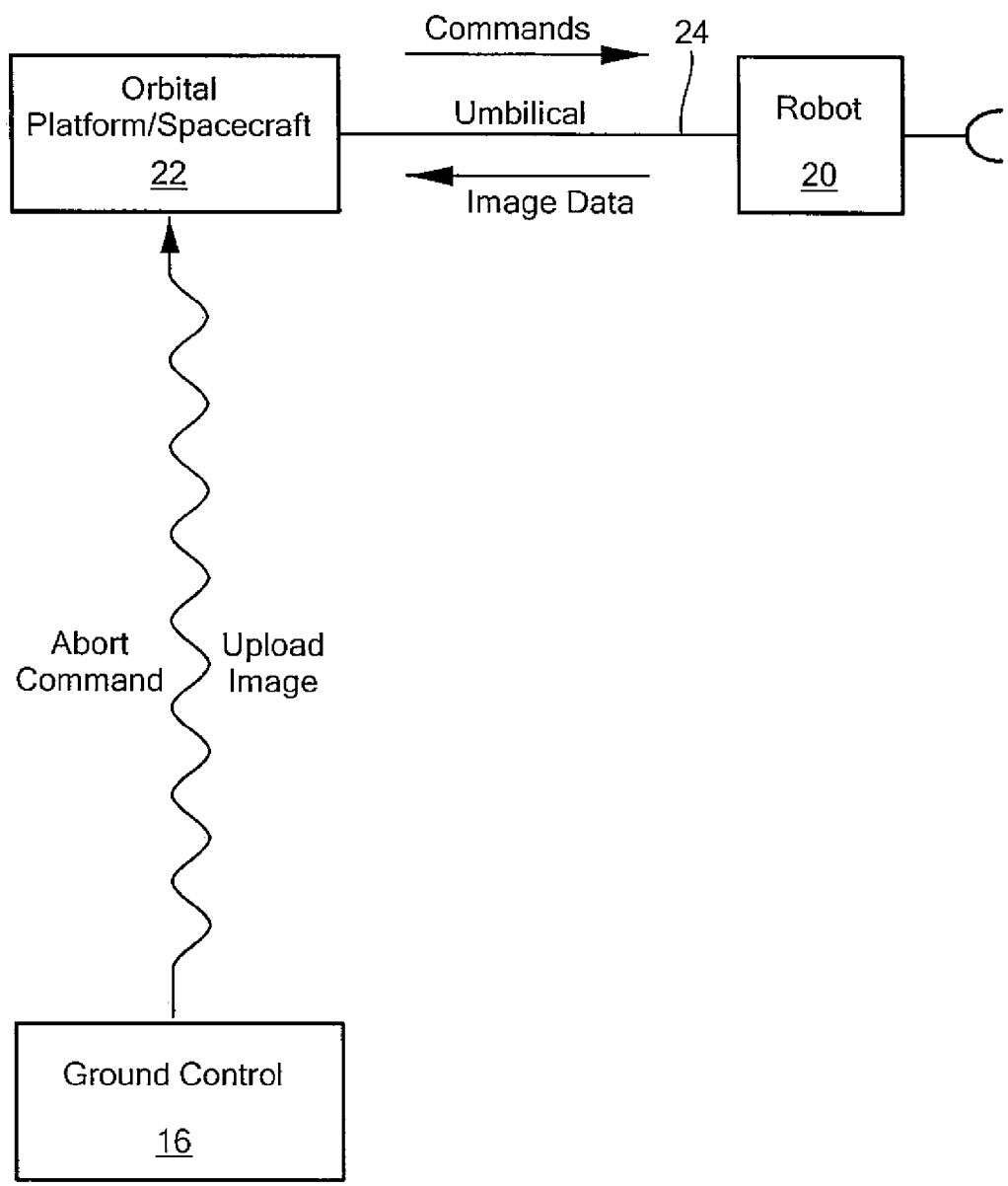
FIG. 2 is a schematic block diagram showing the orbital platform and robot of an example of the invention.
Figure 3:
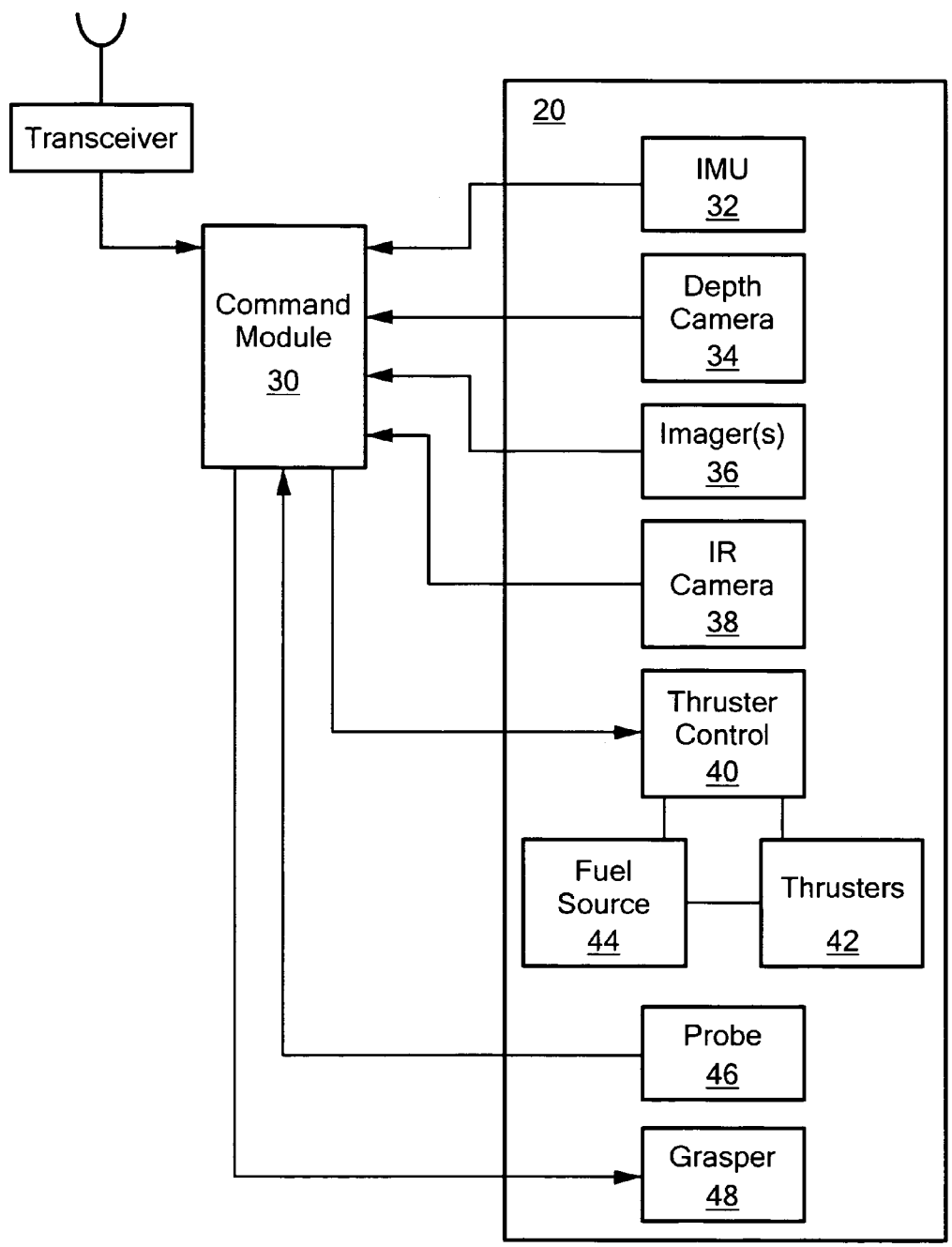
FIG. 3 is a schematic block diagram showing the primary components associated with the robot of FIG. 2 and a command module for controlling the robot preferably associated with the orbital platform of FIG. 2.

In aspects of the invention as shown in FIG. 2, ground control station 16 may still receive images from robot 20 and remotely controlled robot 20 may at least initially be controlled by the ground control station on a given mission but, ultimately, robot 20 is maneuvered autonomously using a command module 30, FIG. 3 which may be onboard platform 22, FIG. 2, onboard robot 20, or distributed between platform 22 and robot 20.

Ground control 16 may also be enabled to transmit an abort command as shown to platform 22 whereupon umbilical 24 is automatically retracted. Ground control 16 may also be used to upload images to platform 22. In general, the orbital platform spacecraft includes one or more docks and an umbilical payout device such as a winch located within the dock. The robot is connected to the umbilical and deployable from the dock. As shown in FIG. 3, robot 20 may include an onboard inertial measurement unit (IMU) 32 transmitting orientation data via the umbilical to command module 30. Robot 20 may also include depth camera 34, and other imagers (e.g., an RGB camera 36 and/or IR camera 38) for transmitting image data via the umbilical to command module 30. A range finder could also constitute an imager. Image data could include pixel data where each pixel represents a brightness and/or color, point cloud (depth data), and/or other data.

Based on the image data and IMU data, command module 30 is configured to recognize an object imaged by the imagers of robot 20, determine the robot's orientation, and issue thrust control commands via the umbilical to thruster control circuit 40 which operates the thrusters 42 of the robot receiving fuel from on-board fuel source 44 such a tank of nitrogen gas. The robot may further include a touch probe 46, a grasper 48, and/or other end effectors or tools.

An object recognition module of the command module recognizes one or more objects typically based on stored images of various objects as compared to the image data received from the robot. The robot's orientation is determined with respect to an identified or recognized object and thrust control commands are then issued by the command module to control the movement of the robot to carry out one or more missions as discussed herein.

In one mission, an image of a component (e.g., a thruster) of a satellite is stored for retrieval by command module 30. Command module 30 (and/or a ground control station) maneuvers robot 20 proximate the satellite and then maneuvers robot 20 about the satellite until the image data received from the robot results in a match with the stored image. Then, command module 30 autonomously or automatically carries out a specific mission by controlling robot 20 to move closer to better inspect the target, move to grasp the target, or remain at a certain location and image the target for analysis by ground control station personnel.

In one example, platform 22, FIG. 2 is a deployed satellite which carries one or more robots 20 used to inspect and/or repair components of the satellite itself. If for example, the satellite has a solar array which has failed to fully deploy, a robot can be used to inspect the very satellite which carries, deploys, and controls the robot.

Figure 4:
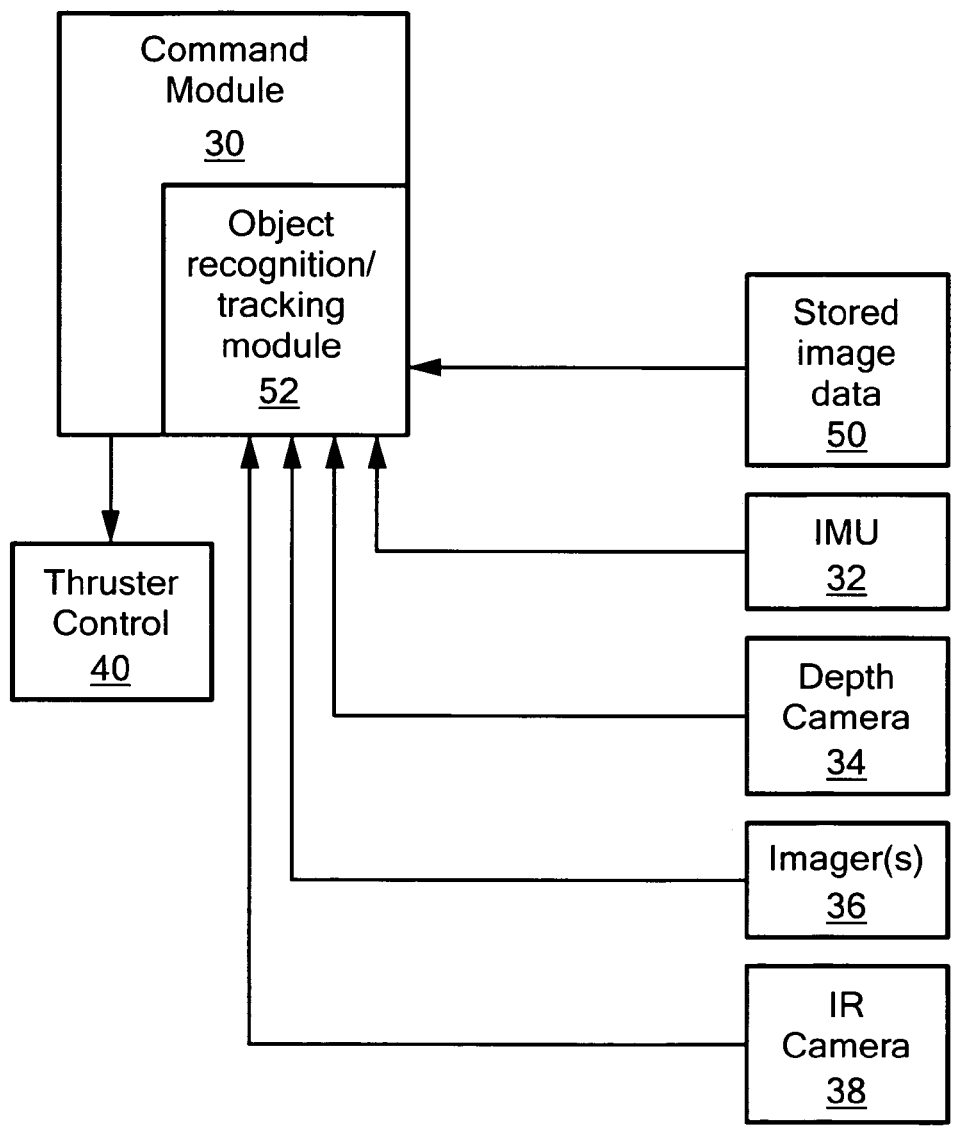
FIG. 4 is a more detailed block diagram showing the object recognition/tracking module of the command module used to control the robot based on one or more inputs.

As shown in FIG. 4, command module 30 may include object recognition/tracking module 52 which compares a stored image in database 50 with image data received from cameras 34, 36 and/or 38 to recognize an object (e.g., a satellite component) and which issued commands to thruster control 40 based on the image data and IMU data to track the object, maneuver closer to it, maneuver around the object, and the like.

Figure 5:
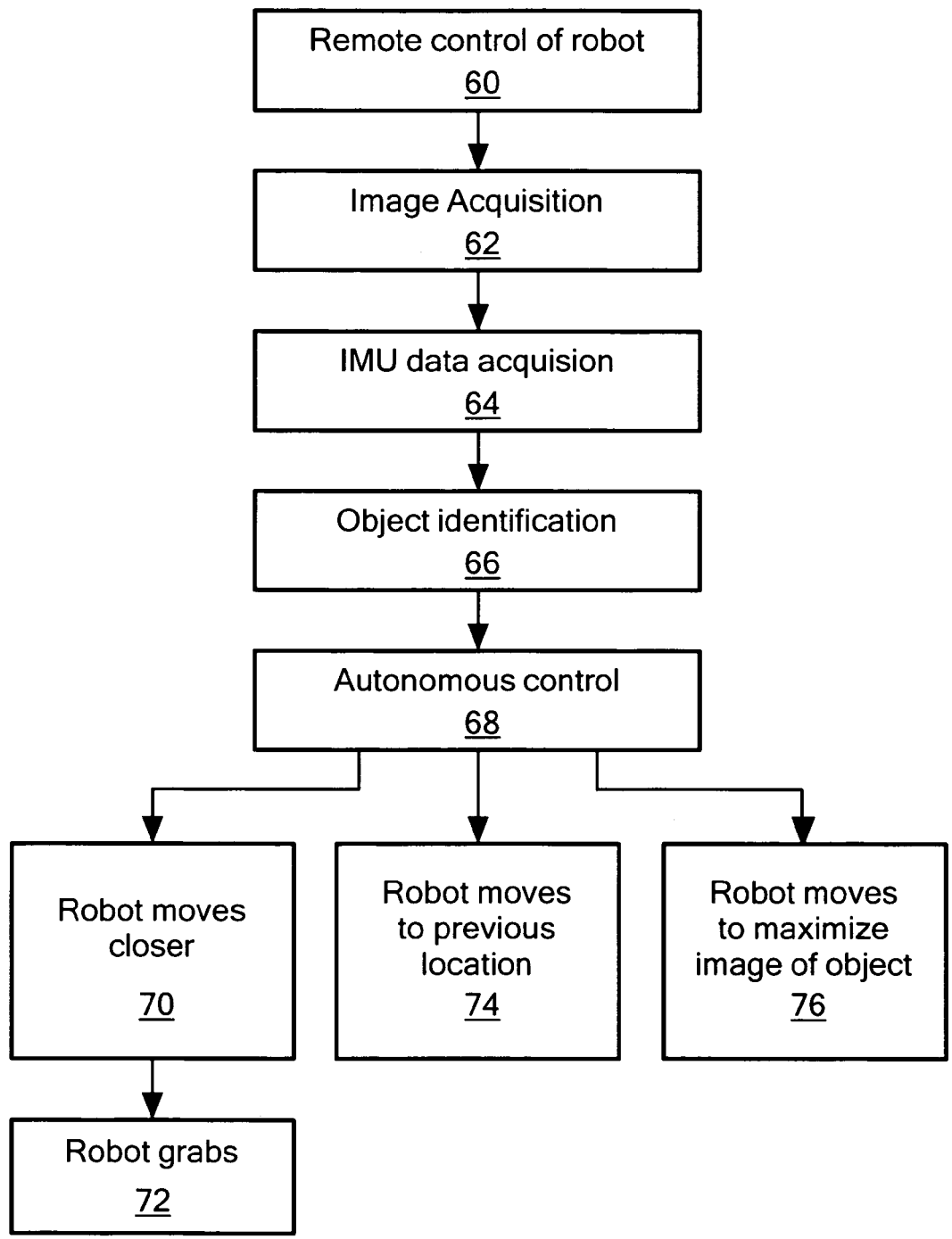
FIG. 5 is a flow chart depicting the primary steps associated with various missions autonomously carried out by the robot and platform.

As shown in FIG. 5, the robot may, at least initially, be remotely controlled at step 60. Image and IMU data are acquired, step 62 and 64 and an object is identified step 66. Now, autonomous control is used step 68 to carry out a preprogrammed mission as command module 30 now controls the robot based on the image and IMU data. In one preprogrammed mission, the command module issues commands to move the robot closer to an identified object, step 70 and, optionally, to grasp the object, step 72.

During this latter process, commands from the ground control station were not used to control the robot. As discussed previously, the next autonomous mission might be to hold a given position and orientation enabling ground control to review images transmitted by the robot via the orbital platform. In another mission, the robot autonomously maneuvers closer to an object while maintaining the same orientation. In another mission, the robot grasps the object and note the robot may have to change its orientation to enable the grasper unit to properly grasp the object. In still other missions, the robot is controlled by command unit to circle an object while maintaining a minimum distance from the object to prevent damage to the object, and the like. In one mission, the robot is commanded to move proximate an object to a location stored as a way point with the robot having a specific orientation relative to the object at that way point. If the robot is disturbed (e.g., by space debris or by an errant command), the command module issues robot thruster firing commands designed to maneuver the robot to the previous way point and to orientate the robot relative to the object as it was previously at that way point, step 74. In step 76, the command module issues robot thruster firing commands which moves the robot and orients it to maximize imaging of the object e.g., scanning an object by moving the robot right, left, and up and down or tracking about the object while ensuring that at no time does the robot touch the object or come within a specified distance of it.

FIG. 7, in one example, shows an image of a thruster cone 80 stored in a file accessible by the command module. This image could be uploaded to the orbital platform from the ground control station. FIG. 6A shows an image 82 captured by an imager on the robot. Using object recognition software and algorithms, the command module now automatically controls the thruster of the robot to reposition the robot and now image 84 is captured and processed. There is now a high likelihood that this image is a portion of a satellite thruster cone 80, FIG. 7. Accordingly, the command module issues robot thruster commands to further relocate and reorient the robot until image 80 is transmitted by the robot to the command module. Image 80 is now a good match with the stored image of FIG. 7.

The robot is preferably an autonomously navigating, self-propelled, flying tool/end effector, powered and commanded via the umbilical cord from the spacecraft vehicle. One or more robots are hosted by and deployed from the much larger spacecraft. The robot and spacecraft are connected via an umbilical line that provides assured retrieval of the robot back into spacecraft following completion of the robot mission, transmits power for robot and bidirectional telemetry.

The system can be used for multiple purposes including disposal of space debris (non-functional satellites), satellite inspection and servicing. While the spacecraft is focused on disposal of large geosynchronous orbit (GEO) satellites to graveyard orbits, it can be used for de-orbiting large low earth orbit (LEO) and middle earth orbit (MEO) debris, such as spent upper stages in polar orbits. The elements of the system are equally suited to orbital inspection missions, providing a flexible tool for investigating satellite system failures.

Avoiding the necessity for a contact between a large vehicle equipped with robotic arms and a debris or a functioning spacecraft that needs inspection or a service is one of the attributes of the robot. The robot allows the spacecraft to stand off a safe distance from the target minimizing the danger of collision and concomitant creation of additional debris which is father minimized by the low mass low momentum robot. This is applicable for debris missions, inspection missions including self-inspection and service (e.g., to pull on stuck solar array). Another mission is robot based refueling where the umbilical line transports liquid or gas propellants. This would be analogous to a re-supply naval ship sailing in parallel with another while transporting fuel. It is also analogous to aerial refueling of combat aircraft.

The robot also allows target vehicle towing (debris to disposal orbit or a functioning satellite in a wrong orbit to correct orbit) which is a lot simpler than pushing. Pushing means attaching a large robotic arm in vehicle to the target and then robotically manipulating the target for thrusters the robotic vehicle to thrust through a new combined center of mass that often has unpredictable location. In the case of debris the location of center of mass is almost always unpredictable.

The robot is also preferably a low cost vehicle. Several robots can be housed and deployed from one platform to perform various functions. The robot obviates on board power generation and storage, many standard avionics features such as star trackers, sun sensors and intensive computation capability needed by a free flyer (to provide local navigation based on vision). The robot umbilical line offers a low cost tool on the end of an infinitely flexible long arm, no free flying object left behind (important in GEO), tow instead of push, high data rate without large antenna, shared computational resources on the platform, shared downlink antenna on platform, undetectable transmissions between robot and platform, and greater endurance.

Figure 8:
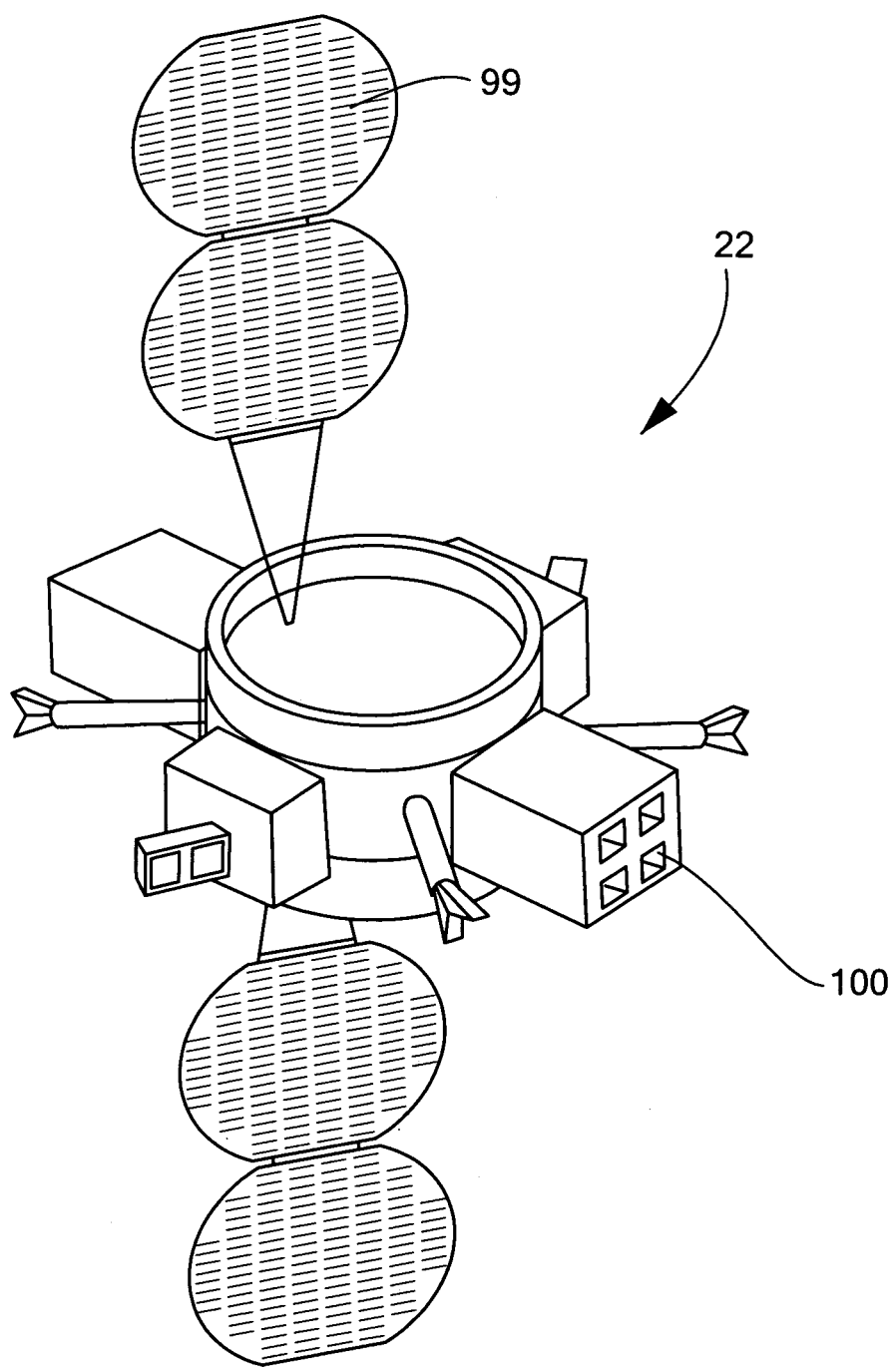
FIG. 8 is a more detailed schematic three dimensional view of an orbital platform in accordance with the invention including docks for up to four tethered robots.

In one example, the spacecraft/orbital platform 22 is shown in FIG. 8. This configuration is based on a 4 port ESPA ring with arrays stowed inside the ESPA ring and four robot vehicles stored in payload ports. The estimated wet mass of the system is 1500 kg. The major advantage of this configuration is that the secondary payload box that stores the robots can be viewed as a separate entity that can be integrated on any spacecraft vehicle including as yet unforeseen spacecraft, not based on ESPA.

Four robot vehicles can be stored in the secondary payload on the ESPA. Each robot can be equipped with different tool. The arrays 99 may provide approximately 4 kW of power. Four of 1.5 KW Hall thrusters provide the robot propulsion. Two will operate at a time. Xenon tanks under the radiators store up to 400 kg of Xe. This system offers the aforementioned 80,000 kg of debris deorbit capability in 40 round trips with a 2000 kg individual debris. In GEO, the required deltaV to a graveyard orbit is very small relative and many more trips could be accomplished.

Figure 9:
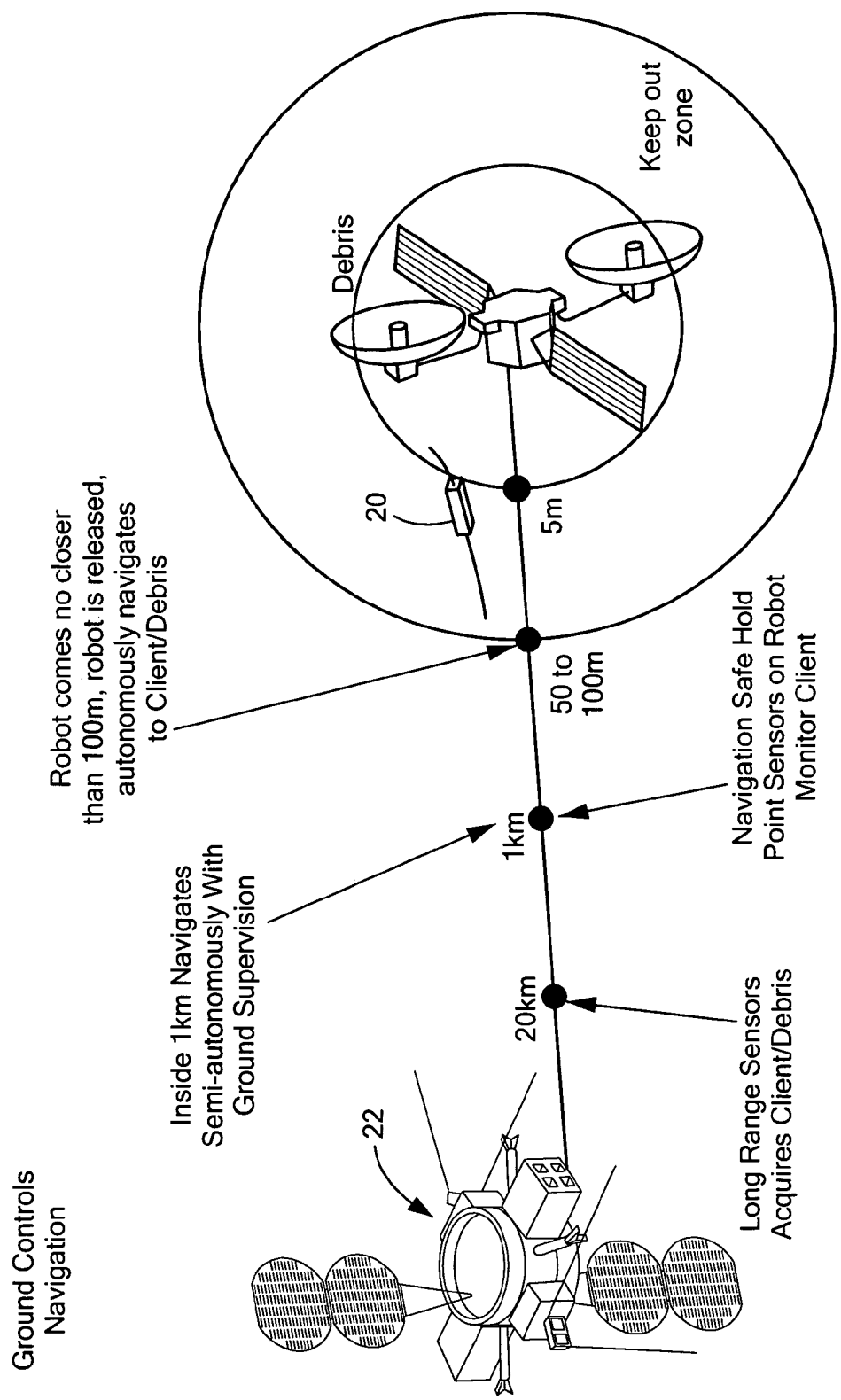
FIG. 9 is a depiction of a typical mission scenario for the orbital platform shown in FIG. 8.

The notional concept of operations (CONOPS) for a typical GEO debris mission is shown in FIG. 9. The robot stops at 2 way points notionally selected at 20 km and 1 km confirming target selection via ground control and performing target surveillance from a safe distance. Upon ground control authorization and possibly under direct ground control, the spacecraft then proceeds to about 100 m distance where a circumnavigation of the target can be performed. The spacecraft comes no closer and releases robot. The robot stops at 5 m and confirms via ground control a target feature to which it can attach itself. Upon ground authorization the robot then autonomously proceeds to execute the attachment. Ground control has the option to abort at any time, however the signal round trip delays/latency may not allow manual ground control. This is one of the significant differences between a large size vehicle attaching itself to the target as opposed low mass robot—a mishap in this face of operation does not lead to catastrophic collision that generates new debris and sends both vehicle tumbling. Once the robot is attached (or performs close inspection in a non-debris mission), the spacecraft reverses its thruster gimbals 180 degrees and starts tensioning the umbilical and gradually towing the debris to a disposal location. Once there, the robot detaches and is reeled back into the spacecraft ready for another mission.

The dynamics of the two large connected/tethered bodies in space have been investigated by many researchers but almost exclusively for tethers that were many kilometers long and where orbital locations of the two connected bodies matter. The dynamics of the short umbilical used here with the orbital elements of connected bodies that are essentially identical allows us to ignore orbital forces which are the same on both objects. Thus, what matters is the relative motion of the bodies and the connecting line and the mutually imposed forces. One object towing another (trailer) will have a natural tendency for the trailer to start oscillating in the cross track direction. The forces that may be employed to dampen the oscillations include: robot cold gas propulsion, electroadhesion effects within the umbilical, and/or electric propulsion plume impingement on the trailer. Other damping means are possible including a stiffening member in the umbilical. If the trailer swings too much in the plume, the plume impingement will push it back, eventually resulting in a low amplitude oscillation around equilibrium. The umbilical provides power, data, and towing capability via Kevlar fiber.

Figure 10:
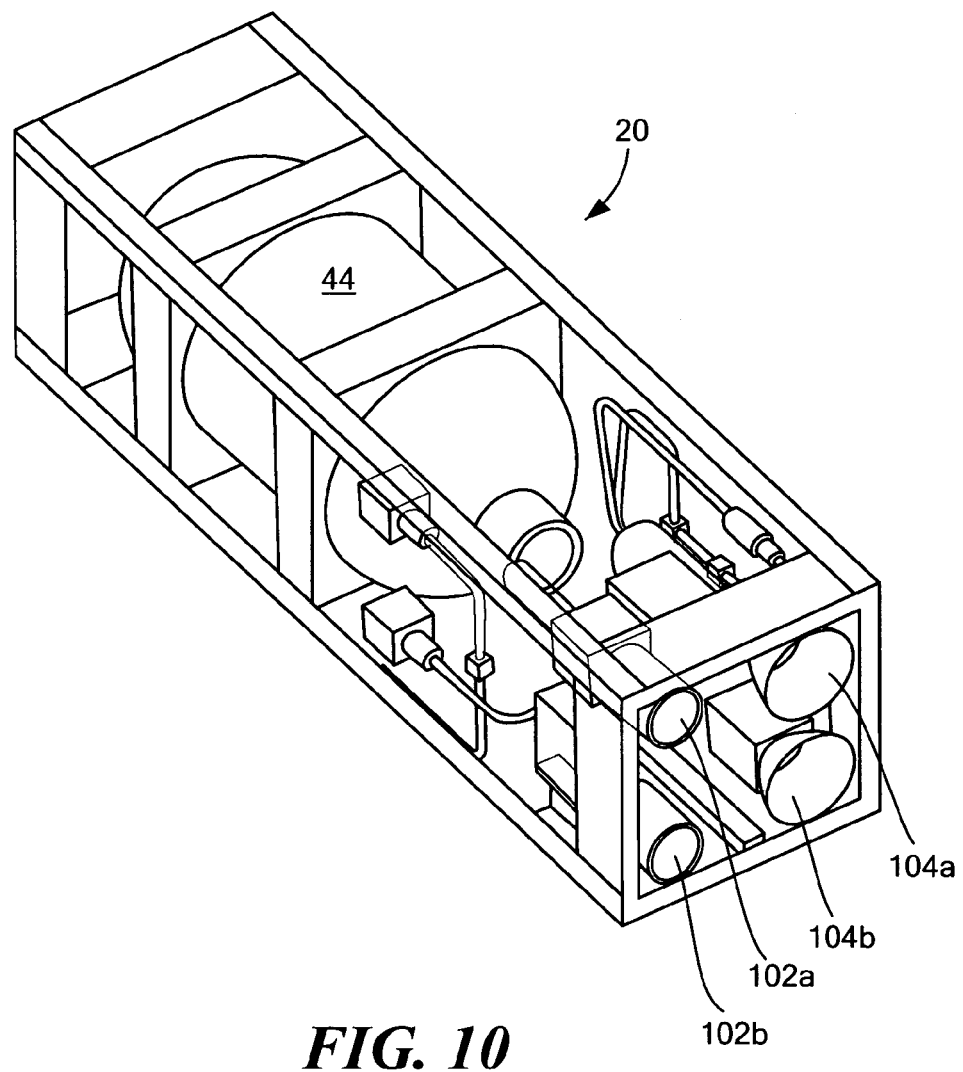
FIG. 10 is a schematic view showing the primary components associated with an example of a robot in accordance with the invention.
Figure 11:
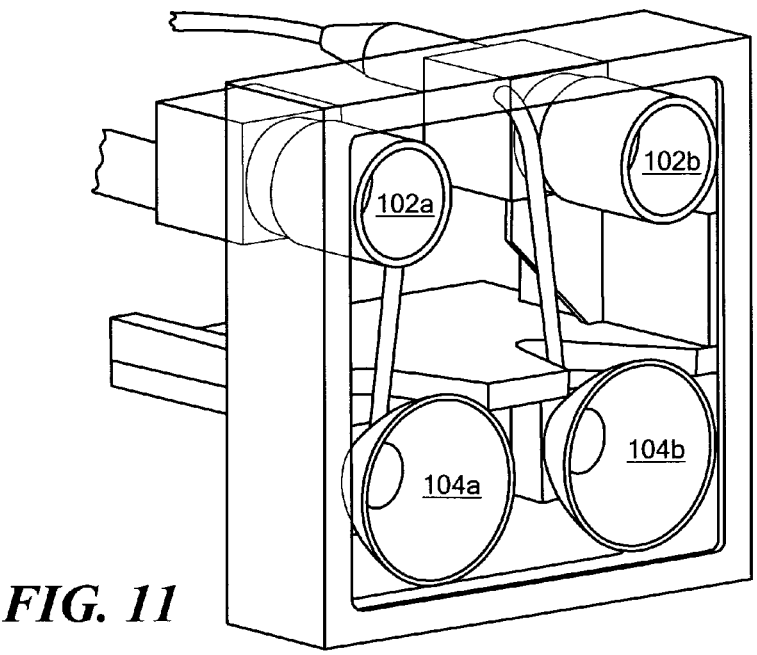
FIG. 11 is an enlarged view showing the cameras and lights associated with the robot of FIG. 10.
Figure 12:
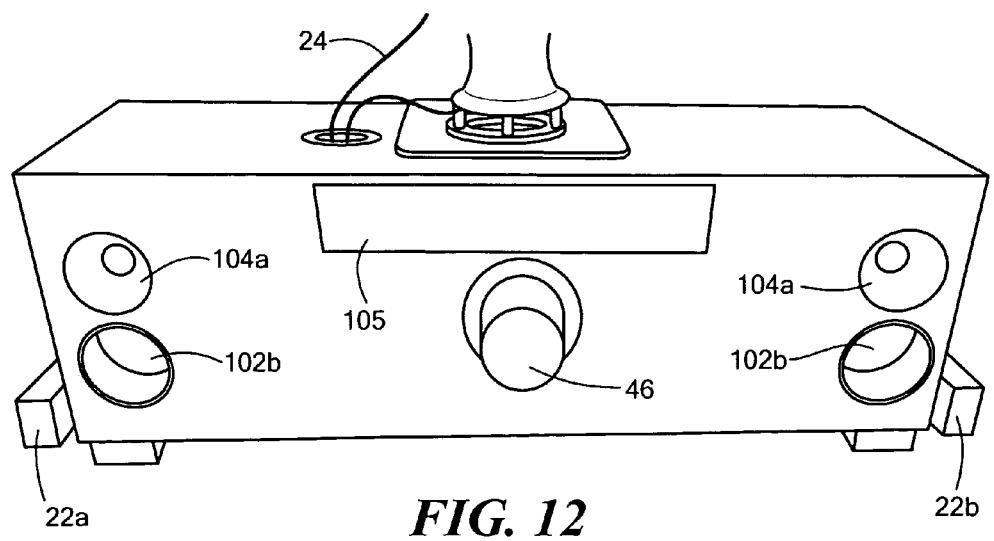
FIG. 12 is a schematic view of a test robot.

In order to navigate successfully, the robot 20, FIGS. 10-12 is able to reliably track the pose (position and orientation) of the target object that it is attempting to image. Mission planners may have prior knowledge of the target object, including 3D models of the target, photographs from multiple viewpoints, etc. This prior knowledge makes it possible to use several techniques for tracking the target object. This prior knowledge condition can be later alleviated by inserting a manual "learning" mode upstream of the tracking. Maneuvering is possible via four to eight or more cold gas thrusters (e.g. 22a, 22b, FIG. 12).

To track the target object, a combined strategy is used which relies on a 3D (depth-sensing) camera for tracking at short distance (<5 meters), and high-resolution color cameras for tracking at longer distances.

Based on analysis of a broad set of trade-offs (sensor accuracy, cost, form-factor, etc.), a number of CCD sensors produced by Point Grey and a pair of 3D cameras 102a and 102b, FIGS. 10-13 produced by PMD Technologies can be used. LED lights 104a and 104b may also be included.

Also, a depth camera can be used as shown at 105. Reasons for using such a depth camera include: active online code development community: (e.g. CLNUI, OpenKinect), support in ROS and Point Cloud Library, active R&D for mapping and navigation functions. PrimeSense is the company that produces the PS1080 chip at the heart of the Kinect and it has released OpenNI framework and NITE middleware that allows access to the Kinect's color and depth cameras, LED, accelerometer and 2-axis pointing motor. Also, the Kinect data stream can be accessed by the MATLAB environment using OpenNI Library.

Figure 14:
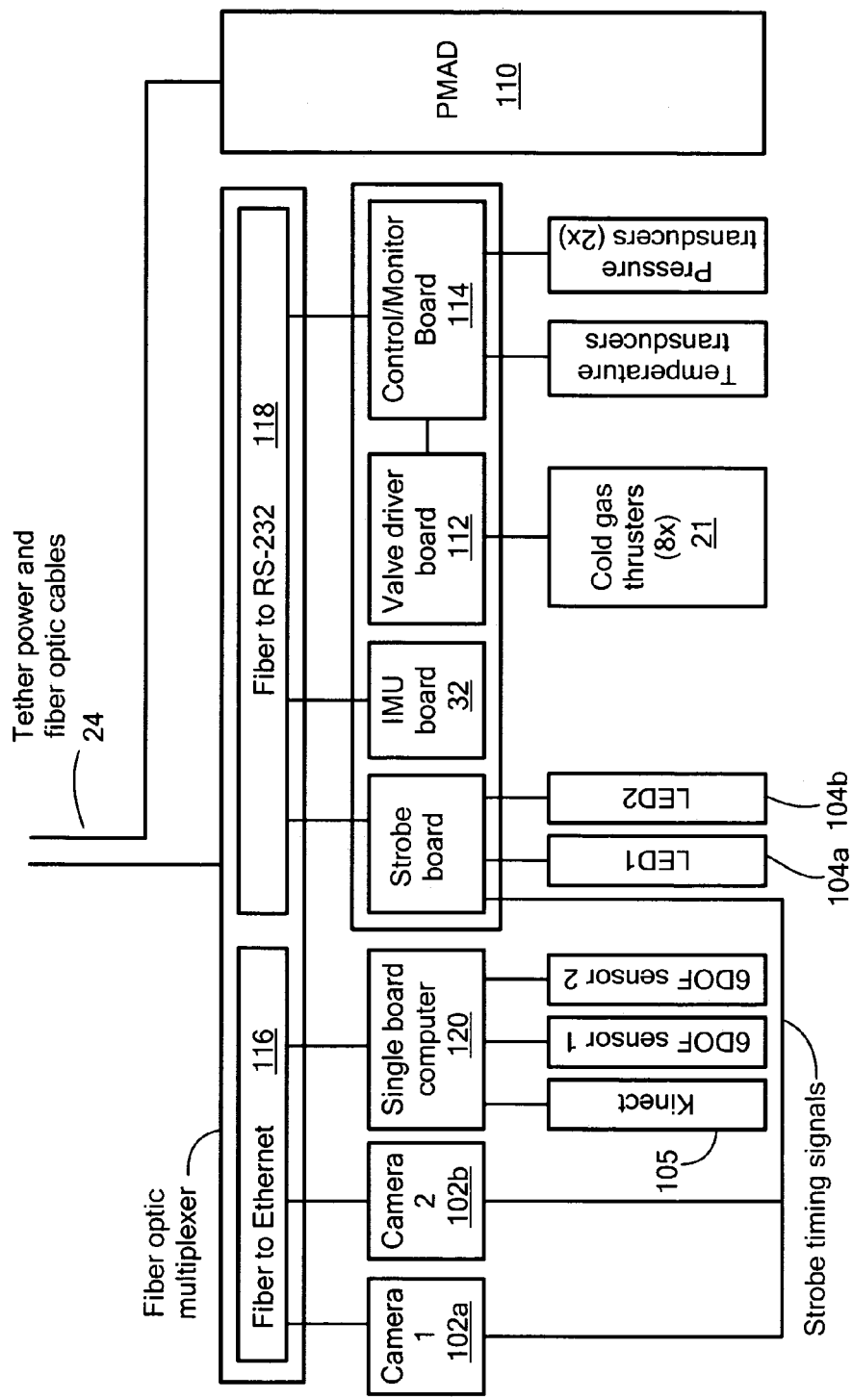
FIG. 14 is a block diagram showing the primary subsystems associated with a robot.

The robot NanoSat electronics includes a combination of COTS and custom systems. The electronics, in general, provide interfacing to all onboard sensors, valve actuation for the cold gas thrusters, power management, fiber optic to serial and Ethernet multiplexing, and health monitoring. A block diagram of the robot electronics system is shown in FIG. 14.

A PC-104 based common backplane allows for a convenient, volume-efficient means to consolidate the current electronics package and reduce excess wiring/cabling. This design includes the following system boards and devices. Power Management and Distribution (PMAD) board 110 converts the 300V input voltage to low voltages required by the various electronics. Valve Driver board 112 integrates twelve valve drivers into a PC-104 board, along with an RS-232 interface and logic level interface. Control and Monitor Board 114 provides valve control and monitoring.

Fiber optic multiplexor (e.g., a Moog 907-GEM and 907-SER, respectively). Cards 116 and 118 allow 2 Gbps to be broken between 4 GigE ports and 8 RS-232/485 channels (10 dB minimum link budget). Devices are tested to shock (30 g, 11 ms, half-sine 3 axes), vibe (5 g, 25-1000 Hz, 3 axes) and temp (−40 to +85 non-op, −10 to +60 op). Identical stacks will exist on both the robot and the command module: a ship set may include 4 cards.

The Kinect depth camera 105 requires some pre-processing to be effectively transmitted over a GigE line. This processing can be implemented on an embedded Linux computer, and there are many commercial options in the PC-104 form factor. Of the array available, the Aurora single board computer (SBC) 120 was chosen for both performance and rugged design and low power draw. The Aurora board is characterized by the following features Intel Atom Z530P at 1.6 GHz, 2 GB of ruggedized RSODIMM™ DDR2 DRAM, MTBF: 211, 720 hours, power: 5.4 W at 5 VDC (fan-less operation, and 4 USB ports. Size, Weight, and Power (SWaP) Estimates.

In one example, the robot was characterized as summarized in Table 1.

TABLE 1

| ID/date | Volume H × L × D (m × m × m) (3) | Dry Mass (kg) (3) | Propellant Mass(kg) (1) | Max Power(W) (2) | Ave Power(W) (4) |
|---|---|---|---|---|---|
| Robot Rev3/ 20130909 | 0.171 × 0.159 × 0.572 | 5.9 | 0.51 | 120 | 40 |

Notes
(1) Nitrogen at 4500 psia,
(2) design max,
(3) excludes air bearings,
(4) under normal operation The power consumption of the robot NanoSat was also calculated by considering the maximum (worst-case) power draw of each component and power conversion loss in the PMAD. The results showed a maximum power draw of 63.97 W.

A high speed data link is typically established between the robot NanoSat and the command module. Fiber optics or a physical wire such as an Ethernet can be can be used because of the ability de deliver power in addition to data.

Fiber optics communications 24 as shown in FIG. 14 are recommended over GigE and USB for several reasons including greater data bandwidth (signal integrity is expected to be maintained in operating the robot using a single uninterrupted length of fiber cable, as opposed to requiring multiple repeaters for USB), and lower mass. Generally the lower the mass of the umbilical, the lower its overall impact upon the robot navigation. Additional modeling must be undertaken to encapsulate the impact of additional umbilical properties (e.g. tensile strength) upon robot navigation.

Figure 15:
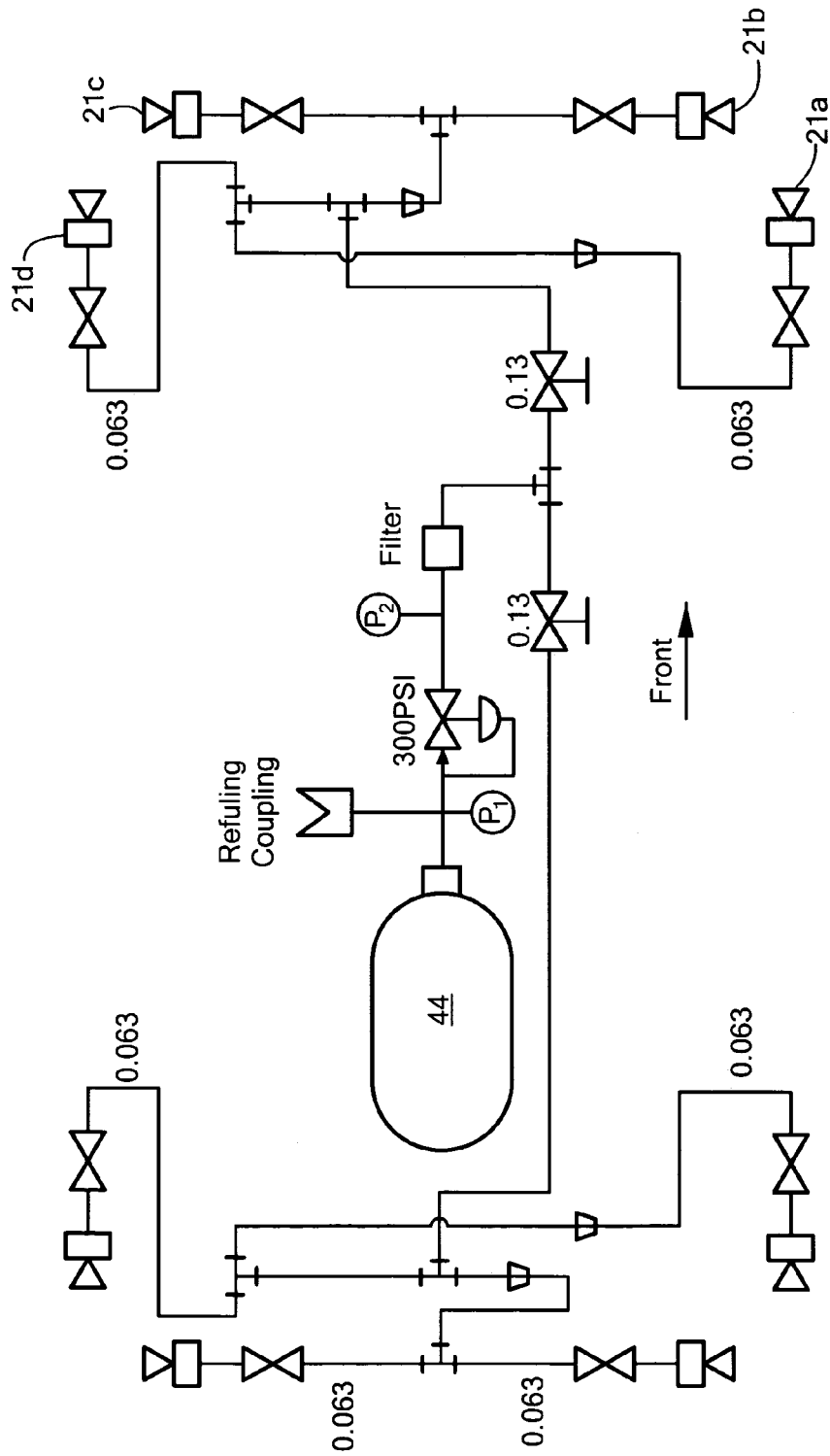
FIG. 15 is a diagram of a robot propulsion system.

The propulsion system of the robot features cold gas thrusters for primary thrust and attitude control. A design of a three-axis cluster for maneuvers is shown in FIG. 15. The valve/thruster performance is summarized in Table 2.

TABLE 2

Cold Gas Thruster Performance (0.0173" orifice)

| Gas | N2 | N2 |
|---|---|---|
| Pressure upstream | 200 psi | 300 psi |
| Min. Opening Voltage | 22 V for 5 to 10 ms to actuate | 26 V for 25ms to actuate |
| Min. Open time pulse | 35 ms | 35 ms |
| Min. holding voltage and current | 6.7 V (with 8 springs) | 6.7 V (with 8 springs) |
| Flow while open | 7.9 liter/min (measured) | 12.5 liter/min (estimated) |
| Thrust | 170 mN | 270 mN |

Figure 16:
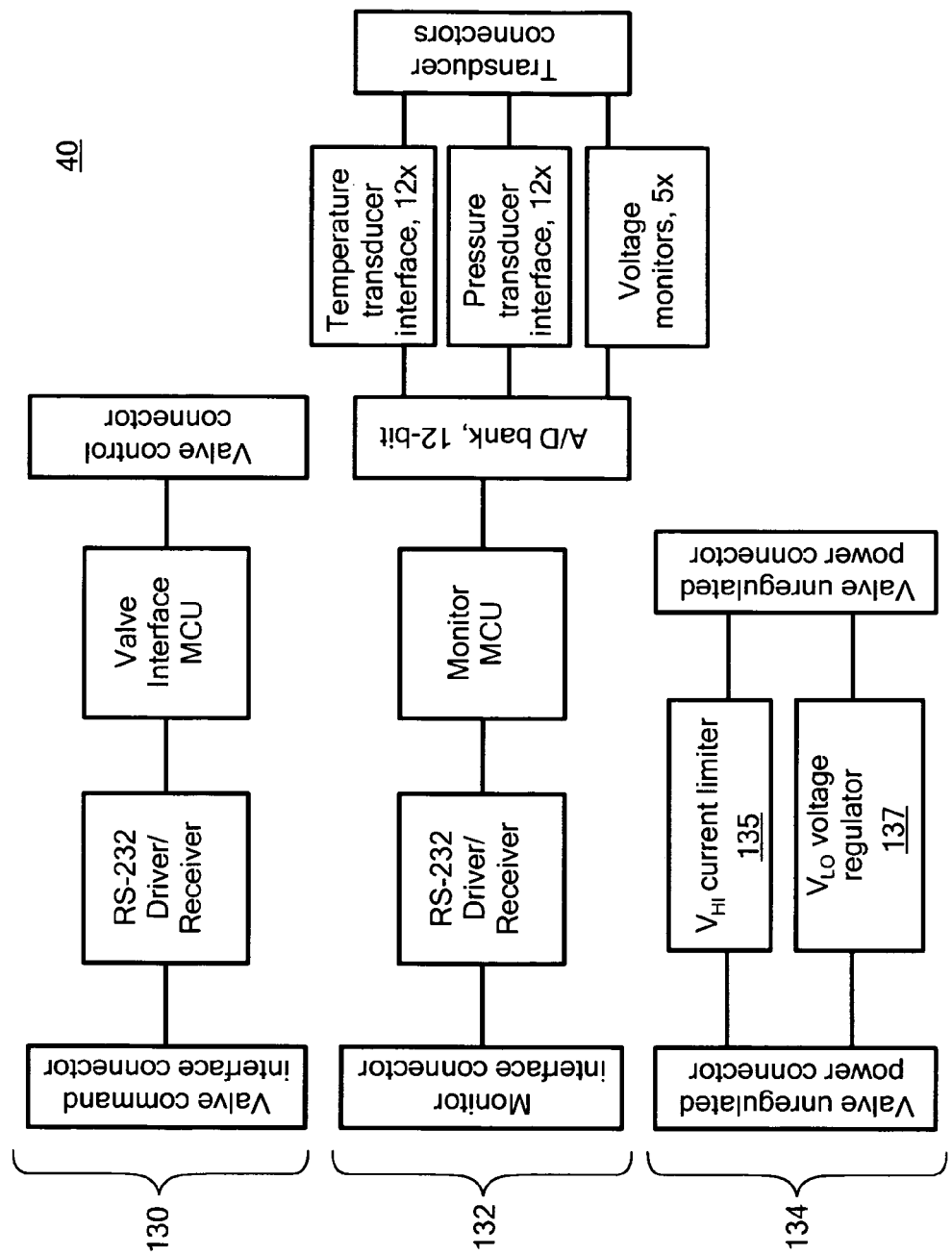
FIG. 16 is a block diagram of the primary components associated with a control/monitoring board shown in FIG. 13.

The thruster control and monitor board 40, FIG. 16 provides three main functions through the following circuit sections. The valve control interfacing section 130 converts RS-232 valve commands received from the serial multiplexer to parallel digital level signals compatible with the valve driver board. The valve power regulation section 134 provides regulation for the valve drive board's $V_{LO}$ and $V_{HI}$ input voltages. The main components include a current limiter 135 for the $V_{HI}$ voltage to set maximum pulse storage capacitor charge rate and an adjustable voltage regulator 137 to set the $V_{LO}$ voltage. Monitor interfacing section 132 provide voltage monitors and interfaces to off-board temperature and pressure transducers. An RS-232 interface is also provided for reading monitor values over the umbilical. Each monitored parameter is measured with 12 bits of precision.

The temperature monitor section provides connections and interfacing for up to 12 off-board Analog Devices AD590 temperature transducers. The AD590 device produces an output current proportional to absolute temperature. The interfacing circuit converts current signals from each temperature monitor to a voltage for analog to digital conversion. Each interface also includes a low pass filter for noise suppression.

The pressure transducer interface section provides connections and interfacing for two pressure transducers. The pressure transducers monitor tank pressure and post regulator pressure.

The control and monitor board power consumption varies with valve operating conditions. These operating conditions include valve $V_{HI}$ voltage settings, valve opening pulse duration, valve holding voltage pulse duration, and valve operating frequency. Estimated power requirements for a set of nominal operating conditions are listed in Table 3. The average power consumption under these conditions is summarized in Table 4.

TABLE 3

Operating Condition Assumptions for Power Requirement Calculations

| Operating condition | Value |
|---|---|
| $V_{HI}$ | 29 V |
| Opening pulse duration | 15 ms |
| Holding pulse duration (set by valve command) | 500 ms |
| Valve open/close cycle frequency | 2 Hz, all valves |
| Number of valves operating | 8 |

TABLE 4

Nominal Valve Driver Power Requirements

| Power Supply Input | Load | Power Consumption | Subtotal |
|---|---|---|---|
| +5 V | Entire board | 109 mW (measured) | .109 W |
| +12 V | Control and monitor contribution | 1.62 W (measured) | 2.57 W |
| | Valve VLO converter (U2) contribution | 0.95 W (calculated, 8 valves, 2 Hz) | |
| +29-33 V | Entire board | 0.3 W (calculated) | 0.3 W |
| | | | Total: 2.98 W |

Figure 13:
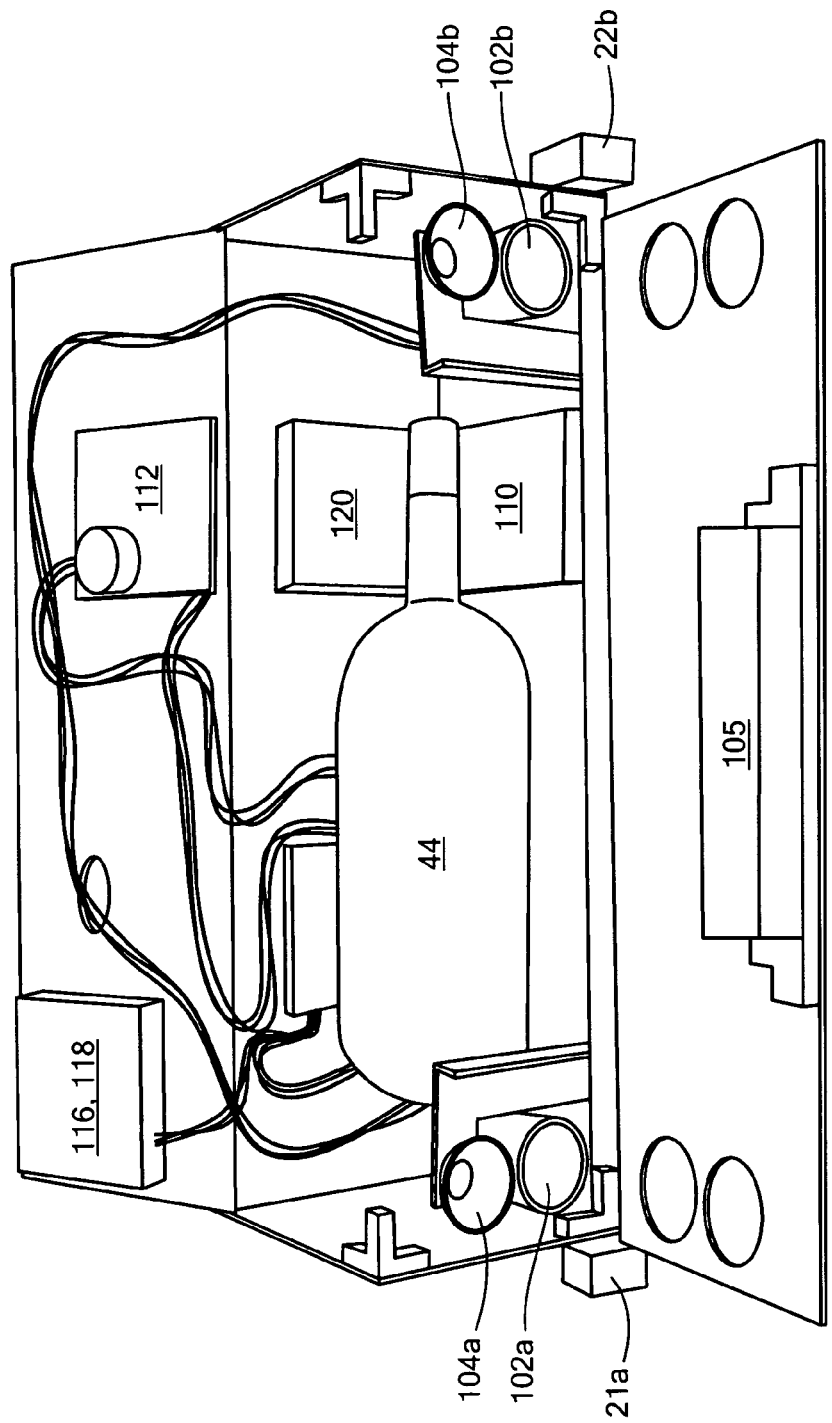
FIG. 13 is a schematic view showing the primary components associated with the test robot of FIG. 12.

The Power Management and Distribution (PMAD) board 110, FIG. 13 supplies regulated power to all components on the robot spacecraft. The PMAD board receives a 300 V nominal input voltage from the umbilical. Four outputs are provided, supplying up to 122 W of output power. The outputs include two fixed voltages (5 V and 12 V) and two variable voltages (24-27 V and 30-33 V).

Figure 17:
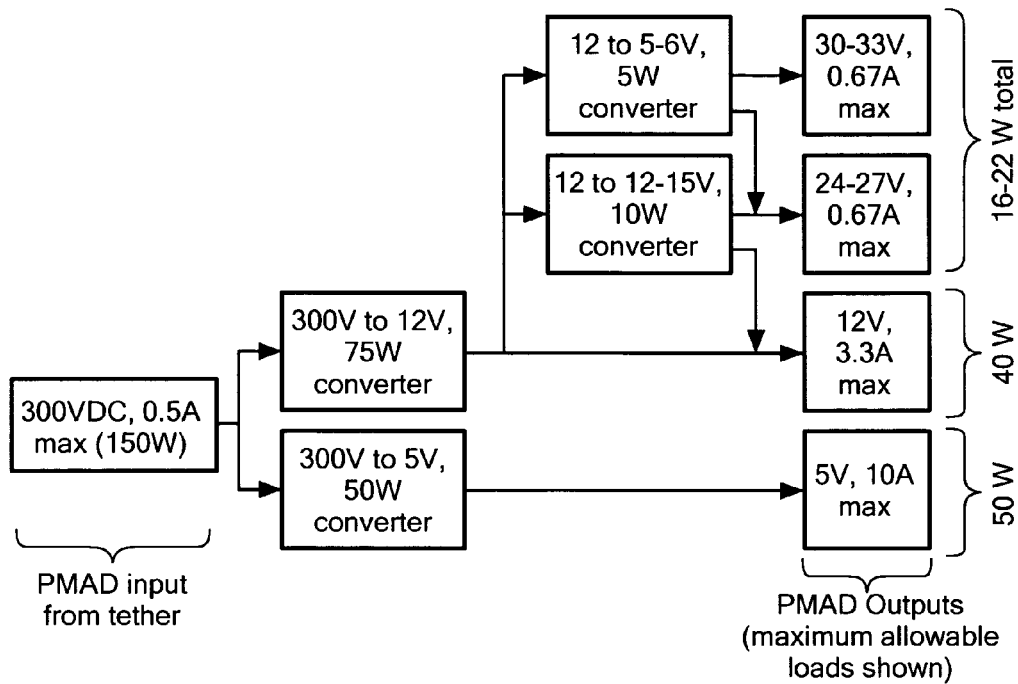
FIG. 17 is a block diagram showing the primary components associated with PMAD board of FIG. 13.

Here, the PMAD board contains four power converters. Two of the power converters are high power units (50 W and 75 W) which dissipate heat through heat spreader plates at the base of the PMAD. The remaining two converters are lower power devices (5 W and 10 W) mounted on the top surface of the board. The converters and high level PMAD design are illustrated in a block diagram shown in FIG. 17.

The PMAD board length and width dimensions conform to the PC-104 standard. One PMAD board weighed 215 g. The PMAD board utilizes a high voltage, low current input provided by the umbilical. The input power specifications are given in Table 5. The specifications for the four outputs are given in Table 6.

TABLE 5

PMAD Input Specifications

| Specification Name | Specification Value |
|---|---|
| Nominal input voltage | 300 V |
| Minimum input voltage | 180 V |
| Maximum input voltage | 375 V |
| Maximum current | 500 mA |

TABLE 6

PMAD Output Specifications

| Specification Name | Specification Value |
|---|---|
| Output name | +5 V |
| Maximum current | 10 A |
| Maximum power | 50 W |

TABLE 6-continued

PMAD Output Specifications

| Specification Name | Specification Value |
|---|---|
| Efficiency, typical | 81% |
| Output name | +12 V |
| Maximum current | 3.3 A |
| Maximum power | 40 W |
| Efficiency, typical | 85% |
| Output name | 24-27 V |
| Maximum current | 0.67 A |
| Maximum power | 18 W, when 24-27 V supply is unused |
| Efficiency, typical | 80% |
| Supply name | 29-33 V |
| Maximum current | 0.67 A |
| Maximum power | 22 W, when 24-27 V supply is unused |

The PMAD board's power dissipation is considered here when all cold gas thruster valves are operating at 2 Hz. The power draw for each PMAD output was considered for the latest robot configuration. The typical power/thermal dissipation of the PMAD board is 10.91 W.

The valve driver board 112, FIG. 13 provides drivers for up to ten cold gas thrusters. Each thruster utilizes a solenoid coil requiring an applied voltage to hold the valve in an open state. The drivers provide the necessary voltage levels and an opening voltage pulse for each valve solenoid. The valve driver board also provides a logic level command interface to activate each valve.

Figure 18:
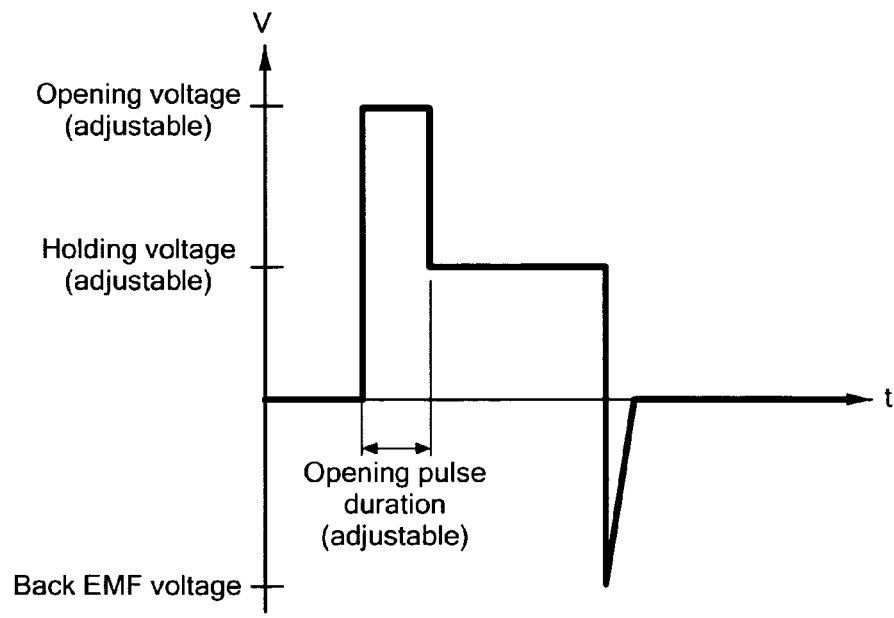
FIG. 18 is a graph showing the output of the valve driver board of FIG. 13.

The valve driver provides a brief high voltage opening pulse ($V_{H1}$), then drops to a lower holding voltage ($V_{LO}$) to reduce power consumption. The valve solenoid is allowed to develop a back EMF to enable faster valve closure. The back EMF is clamped to −24 V to avoid damage to the valve driver electronics. A typical valve pulse profile is shown in FIG. 18.

Figure 19:
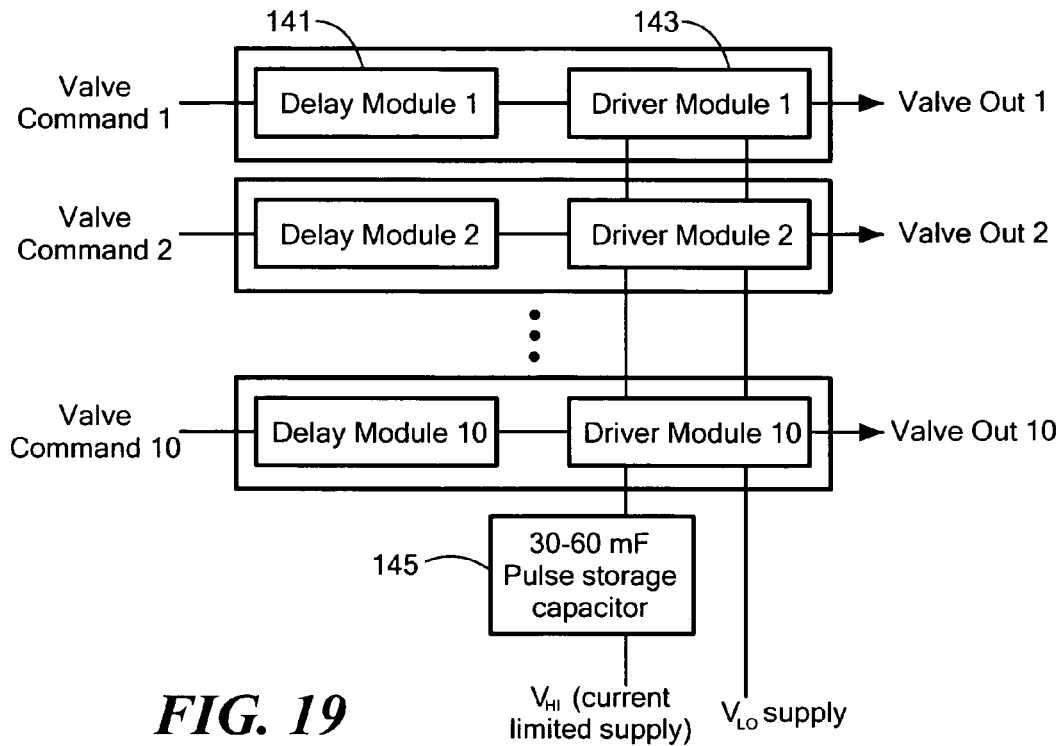
FIG. 19 is a block diagram showing the primary components associated with the valve driver board of FIG. 13.

The valve driver board contains three subcircuits shown in FIG. 19: delay modules, driver modules, and a pulse storage capacitor. The delay modules 141 provide an adjustable delay to set each valve's opening pulse duration. The driver modules 143 include MOSFET switching for the opening and holding pulse voltages. The pulse storage capacitor 145 provides high current for the opening pulses.

The valve driver board is nominally configured with a single 30 mF capacitor to provide the high current opening voltage pulses. In this configuration, the board weighs 146 g. An optional second 30 mF capacitor can be added, increasing board weight to 247 g.

The valve driver board provides outputs to drive up to ten valves. Each output responds to control signals provided by the valve command interface. The high voltage opening pulse duration is set by potentiometers on the valve board. The specifications for each output are identical and are summarized in Table 7.

TABLE 7

Valve Output Specifications

| Specification Name | Specification Value | Notes |
|---|---|---|
| Output Name | Valve Out 1-10 | Outputs to valve solenoid coils |
| Maximum current | 1.5 A | 40% power MOSFET margin |
| Maximum holding voltage | 9.5 V | |
| Minimum holding voltage | 2.5 V | |
| Maximum opening voltage | 35 V | Limited to 33 V by PMAD board |
| Minimum opening voltage | 0 V | Limited to 24 V by PMAD board |
| Maximal droop in opening voltage during normal operation | 1.0 V | Voltage droop caused by capacitor discharge. Estimated for 2Hz operation with simultaneous opening of four valves. Valve resistance 25 ohms, valve inductance. 30 mH, $V_{HI}$ = 0.5 A, 29 V, opening pulse duration, 10 milliseconds. |
| Back EMF voltage | −24 V | Zener diode clamp |
| Opening pulse duration | 1-55 milliseconds | Individually adjustable via. Trimpots |
| Holding pulse duration | 0-∞ milliseconds | Set by valve command signals |

A valve command interface is provided to issue valve open/close commands to up to ten valves. The valve command interface consists of ten 5V digital inputs. The corresponding valve opens in response to a high level signal and closes in response to a low level or open circuit signal. The command interface is described in Table 8.

TABLE 8

Valve Command Interface Specifications

| Specification Name | Specification Value |
|---|---|
| Signal Name | Valve Command 1-10 |
| Interface | Discrete bi-level |
| Type | 5 V Logic |
| Mode | Active High |
| High Vo Min | 2.5 V |
| Low Vo Max | 0.6 V |
| Isolation | Not isolated |

The valve board requires three power inputs ($V_{HI}$, $V_{LO}$, and +5V). The $V_{HI}$ input provides power for the opening voltage pulse and the $V_{LO}$ power input provides power for the holding voltage pulse. The $V_{HI}$ supply is preferably current limited since it is used to charge a large capacitance on the valve driver board. The $V_{LO}$ supply may not require current limiting. The +5V power supply input is used by the delay modules. The power interface specifications are given in Table 9.

TABLE 9

Valve Board Power Interface

| Specification Name | Specification Value |
|---|---|
| Supply Name | +5 V |
| Nominal Voltage | 5.0 V |
| Voltage Range | 4.5-10.0 V |
| Current | <406 mA |
| Supply Name | $V_{HI}$ |
| Voltage Range | 0-35 V |
| Current Range | 0-1.0 A |
| Supply Name | $V_{LO}$ |
| Voltage Range | 0-12 V |
| Current Range | 0-3 A |

The valve driver power board power requirements vary with operating conditions. These operating conditions include $V_{H1}$ and $V_{L0}$ voltage settings, valve opening pulse duration, valve holding voltage pulse duration, and valve operating frequency. The estimated power requirements for the specific set of operating conditions listed in Table 10. The average power consumption under these conditions is summarized in Table 11.

TABLE 10

Operating Condition Assumptions for Power Requirement Calculations

| Operating Condition | Value |
|---|---|
| $V_{HI}$ | 29 V |
| $V_{LO}$ | 6.5 V |
| Opening pulse duration | 15 ms |
| Holding pulse duration (set by valve command) | 500 ms |
| Valve open/close cycle frequency | 2 Hz, all valves |
| Number of valves operating | 8 |

TABLE 11

| Power Supply input | Average Power Consumption 8 valves @ 2 Hz |
|---|---|
| +5 V | <240 mW |
| $V_{HI}$ | 420 mW |
| $V_{LO}$ | 1.38 W |
| Total | 2.04 W |

Figure 20:
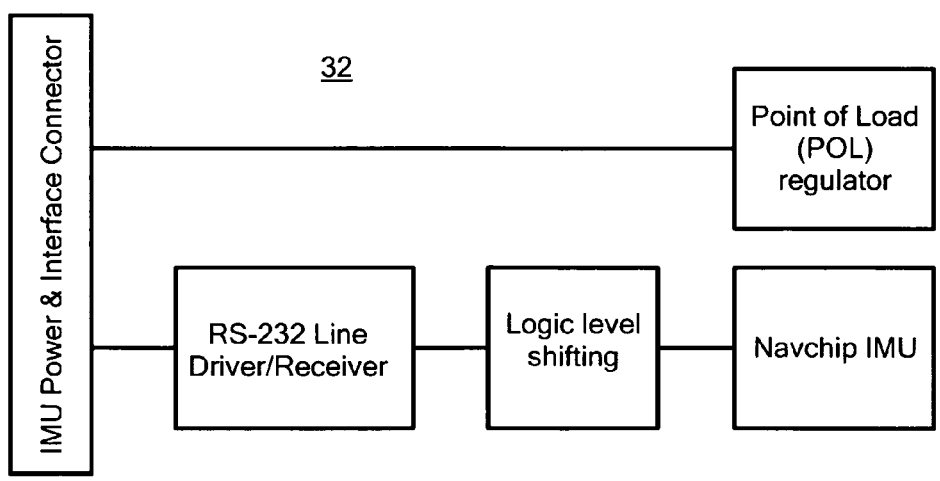
FIG. 20 is a block diagram showing the primary subsystems associated with the IMU board of FIG. 13.

The Inertial Measurement Unit (IMU) board 32, FIG. 13 provides power and serial interfacing for an InterSense Navchip IMU device. The IMU board's design is described in the block diagram of FIG. 20. The IMU Board's mass is 21 g.

The IMU board provides an RS-232 interface for communication with the serial multiplexer board. Specifications for the RS-232 interface are given in Table 12. The IMU board requires a +5V power input specified in Table 13.

TABLE 12

IMU Board RS-232 Interface Specifications

| Specification Name | Specification Value |
|---|---|
| Output Name | Tx IMU |
| Mode | +/−5 V logic |

TABLE 12-continued

IMU Board RS-232 Interface Specifications

| Specification Name | Specification Value |
| --- | --- |
| Vo High, min | 5 V |
| Vo Low, typical | 5.4 V |
| Vo Low, min | −5 V |
| Vo Low, typical | −5.4 V |
| Input Name | Rx IMU |
| Mode | +/−5 V logic |
| Positive going input threshold voltage, max | 2.4 V |
| Positive going input threshold voltage, min | 0.8 V |
| Input resistance | 3-7 kΩ |

TABLE 13

IMU Board Power Interface Specifications

| Specification Name | Specification Value |
| --- | --- |
| Supply Name | +5 V |
| Nominal Voltage | 5.0 V |
| Voltage Range | 4.5-5.5 V |
| Current | 66.3 mA (measured) |

The measured power consumption of the IMU board is 331.5 mW.

Figure 21:
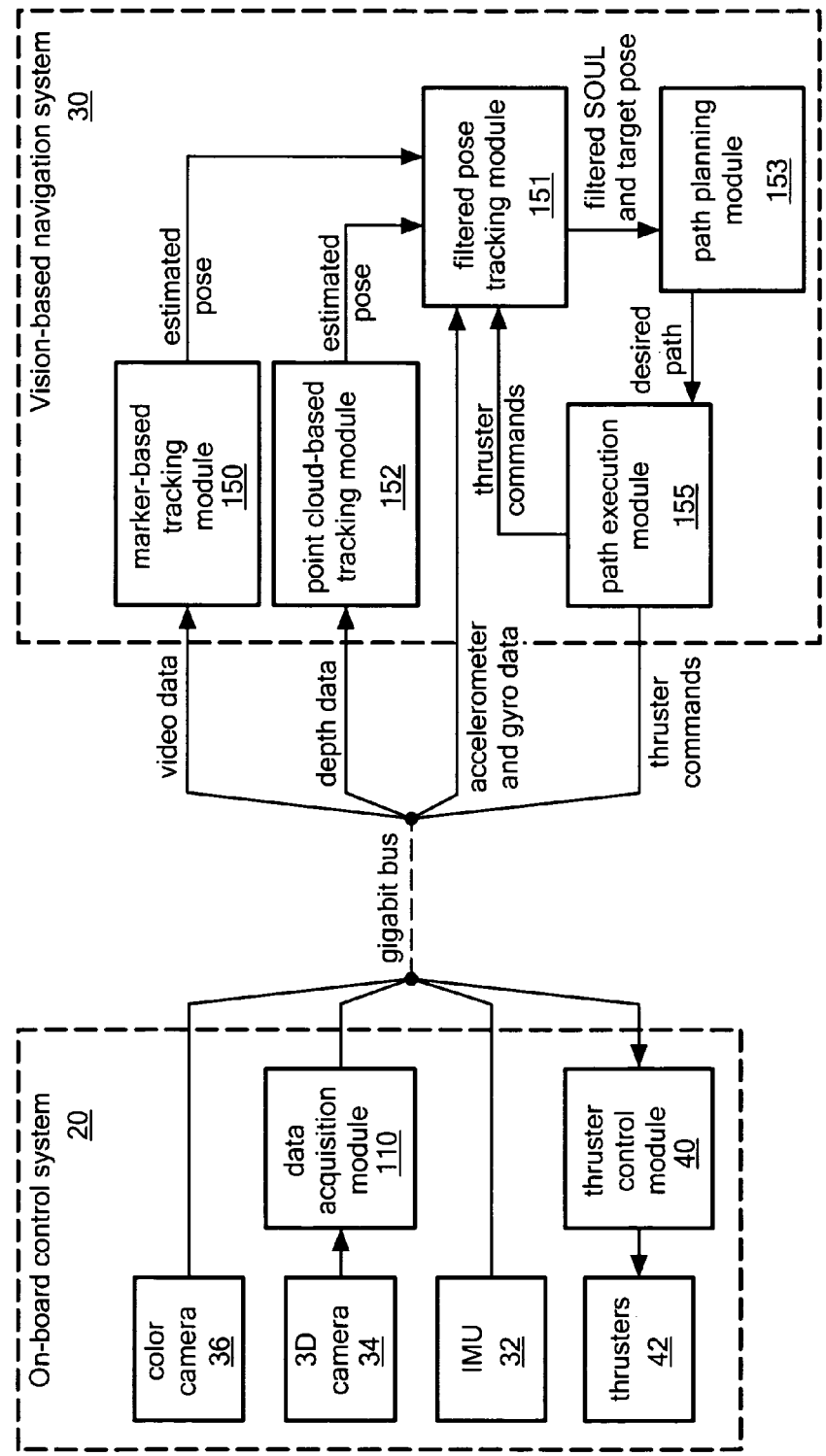
FIG. 21 is a block diagram showing the interrelationship between and the primary subsystems of the command module shown in FIGS. 3 and 4.

The robot control system includes both on-board data processing carried by the robot module (left half of FIG. 21) as well as processing carried by the platform or host space vehicle (HVS) (right half of FIG. 21). The HSV communicates with the robot module via a gigabit fiber-optic link incorporated into the umbilical. The majority of the software modules in the control system operate on the HSV. The command module in the prototype version included 8 Intel i7 processor cores, with 8 GB of available RAM. On-board processing on the robot module is handled by a mix of custom electronics, such as the thruster control module and IMU board, as well as an embedded single-board computer (SBC). The SBC was a Diamond Systems "Aurora" board running Ubuntu 10.04. The SBC features a single Intel Atom Z-series processor and 1 GB of RAM.

The flow of information through the system proceeds as follows. Video data from the RGB cameras and depth data from the 3D camera is captured on board the robot module and then relayed to the HSV via the gigabit bus. Incoming video data is processed by the marker-based tracking module (150). Incoming depth data is processed by the point cloud-based tracking module (152). Each of these tracking modules then produces an estimated pose (3D position and orientation) for the robot module relative to the target object.

The estimated poses produced by the different tracking modules are then processed by the filtered pose tracking module 151 which combines the incoming estimates into a single, filtered estimate of the robot module's target-relative pose. Along with the vision-based estimates, the filtered pose tracking module additionally integrates feedback data from the thrusters as well as accelerometer and gyroscope data captured by the on-board IMU.

Next, the path planning module 153 uses the integrated pose estimate produced by the filtered pose tracking module 151 to plan a collision-free path to the next mission waypoint, in keeping with prespecified mission goals. This desired path is then analyzed by the path execution module 155 which computes a set of thruster timing commands. These thruster commands are then relayed via the gigabit bus to the on-board thruster control module, which finally translates the commands into actual thruster valve firings. The major data acquisition systems are summarized in FIG. 22.

As described previously, the system components on board the robot module communicate with the main control PC on the HSV via a single fiber-optic cable. To enable communications across this channel a Moog-907 fiber-optic multiplexor was employed at both ends of the cable. Each Moog-907 provides 4 gigabit Ethernet ports (the maximum total bandwidth between the multiplexors is 2 Gb/s). Each multiplexor additionally provides 8 RS-232 ports, thus allowing for simultaneous serial-based communications as well as Ethernet-based communications across the fiber-optic cable.

To capture color images for vision processing, the robot module may use two Point Grey Flea3 RGB cameras. Each Flea3 camera is capable of capturing color images at a resolution of 1288×964 pixels at approximately 30 Hz. Captured images are relayed to the main control PC via Ethernet using the GigE video communication protocol. On the control PC, the Point Grey FlyCapture SDK was used to acquire the incoming images from the GigE stream. For additional image post-processing, an OpenCV, an open-source toolkit for image processing and machine vision is used. In particular, OpenCV was used to de-warp the raw video images based on stored lens parameters (the lens parameters can be pre-computed via an interactive training process which makes use of a "chessboard" calibration pattern).

To capture depth data for point cloud-based vision processing, the robot module uses a Microsoft Kinect structured light camera. The Kinect camera is connected to the on-board SBC via USB. A data capture process running on the SBC captures depth frames with a resolution of 640×480 samples from the camera at approximately 30 Hz. These depth frames are then relayed to the main control PC via Ethernet using an ad hoc, UDP-based data streaming protocol. On the control PC, the depth frames are decoded from the incoming data stream, and used as input to the point cloud-based tracking module.

For inertial measurement, the robot module makes use of the Intersense NavChip IMU. The NavChip measures 3D acceleration and rotational velocity at 200 Hz. This inertial data is streamed to the main control PC via RS-232 (by way of the fiber-optic multiplexors). On the control PC, we use an FTDI USB/serial converter to acquire the incoming RS-232 data.

To manage thruster valve firings for the eight on-board robot thrusters, the thruster control board 40, FIG. 21 is configured to receive thruster timing commands via RS-232. The timing commands are generated at a fixed rate of 2 Hz by the path execution module, which runs on the main control PC. The commands are written to RS-232 via an FTDI USB/serial converter, and then relayed directly to the thruster control board by way of the fiber-optic multiplexors.

FIG. 21 also shows marker-based 150 and point cloud-based 152 tracking modules. These vision-based tracking modules are used for absolute localization information so the robot is able to reliably track the pose (position and orientation) of the target object in order to navigate successfully.

In a framing operational scenario, the robot is deployed from a larger host space vehicle (HSV) with the goal of inspecting and potentially interacting with the exterior of the HSV or other target objects in the nearby environment. For a prototyping effort, a galvanized metal bucket was used as the target object for robot's demonstration missions. The galvanized bucket was selected because it resembles a typical thruster cone that could be a prominent feature of the exterior of the HSV. As would be the case with a thruster cone, the bucket's curvature and specularity make it a relatively challenging visual target. An existing, marker-based tracking framework may be used such as the AR Toolkit, a popular, open-source, fiducial tracking system.

AR Toolkit operates by scanning video images for fiducial patterns which are made up of a black square on a white background. Multiple fiducials can be disambiguated by the pattern inside the square, while the square itself is used to calculate 3D position and orientation. The standard AR Toolkit process is modified to accept remotely captured images via interprocess communication (Unix domain sockets), and to relay its computed tracking data via a similar socket connection. A complete tracking pipeline consists of the following stages. Capture incoming video frames from the GigE bus via the FlyCapture SDK. Using OpenCV, de-warp the raw video images based on stored lens parameters. Relay the de-warped images to the AR Toolkit process via interprocess communication. Receive marker position and orientation data back from the AR Toolkit process, and use this information to compute robot's pose relative to the target object.

The full tracking pipeline described above operates at approximately 30 Hz, with the main limiting factor being the capture rate supported by the GigE bus. Multiple markers can be attached to the target object (bucket). The geometric relationship between these multiple markers can be pre-computed in a training phase, by moving the camera around such that two markers can be viewed simultaneously. Once the geometric relationships are calculated, only one marker is required to estimate robot's pose, although multiple markers can be used simultaneously for a more robust estimate.

Figure 23:
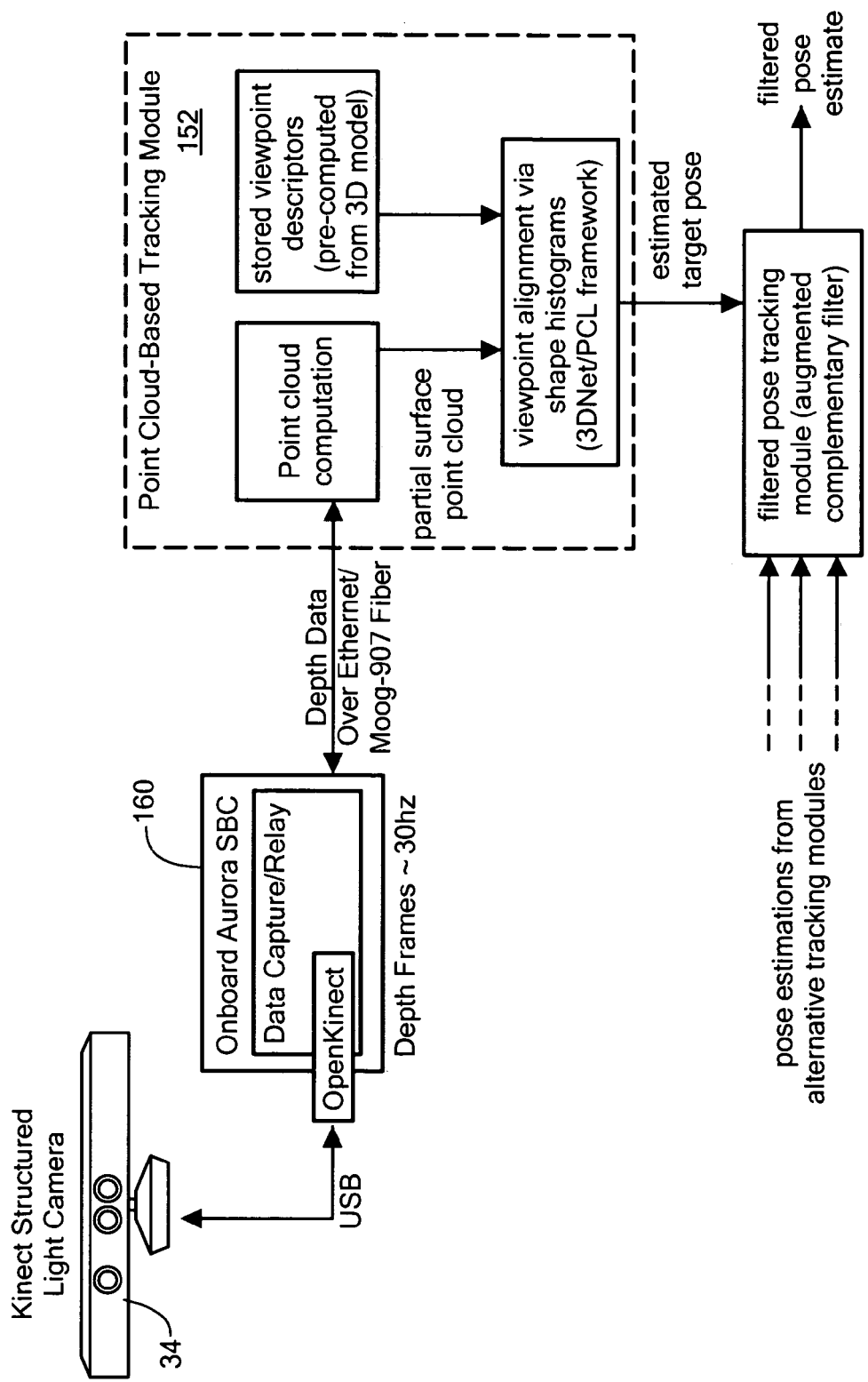
FIG. 23 is a flow chart depicting the primary steps associated with the point cloud-based tracking module of FIG. 21.

A true, marker-free vision system for tracking the relative 3D pose of the target object can include a 3D, depth-measuring camera, e.g., the Microsoft Kinect structured light camera 34, FIG. 23.

The depth camera-based tracking pipeline can be designed based on the Aldoma et al. paper "Tutorial: Point Cloud Library: Three-Dimensional Object Recognition and 6 DOF Pose Estimation" incorporated herein by this reference. The full tracking pipeline is summarized in FIG. 23. As can be seen in the figure, depth data from the Kinect structured light camera is captured by grabber software running on the on-board Aurora SBC 166. The grabber software makes use of the open-source OpenKinect library to pull depth frames from the Kinect over USB at approximately 30 Hz. These depth frames are relayed over Ethernet to the main control PC via the Moog-907 fiber optic multiplexor.

On the main control PC, the incoming depth frames are processed by the point cloud-based tracking module 152 to produce an estimate of the relative 3D pose of the target object. The tracking module is built on top of the open-source 3D-Net software framework, which is an extension of the open-source Point Cloud Library (PCL). Following the Aldoma et al. paper, the pose estimation process consists of the following stages:

1. Pre-processing: generate partial point clouds from multiple perspectives using a 3D model of the known target object. Use these partial point clouds to compute a database of stored viewpoint descriptors, which capture structural information about the target object in different orientations/poses based on a configurable set of shape histograms.
2. During live processing, use the incoming depth frame to compute a partial surface point cloud of the target object from the current vantage point.
3. Compare the observed surface point cloud against the stored database of viewpoint descriptors computed in Step 0, and select the N closest matches based on CVFH (clustered viewpoint feature histogram) feature distances.
4. Compute final orientations for the N best matches using CRH (camera roll histogram) data.
5. Run several iterations of ICP (iterative closest point) to refine the alignments of each of the N best matches.
6. Apply hypothesis verification to find the most likely match out of the N refined possibilities.

This process produces a single best estimate of the current 3D position and orientation of the target object. This pose estimate is then provided as input to the filtered pose tracking module, where it can be combined with pose estimations from other tracking modules (such as the marker-based tracking module). The filtered pose tracking module uses an augmented complementary filter to produce a unified, filtered estimate of the 3D pose of the target object, which is then used by other elements of the larger control system, such as the path planning and path execution modules.

A number of software enhancements can be made to streamline the process of testing and refining the point cloud-based tracking module. These include adding support for recording and playback of the realtime depth camera data stream and adding 3D visualization of the hypothesis generation, refinement, and verification stages of the pose estimation process.

Figure 22:
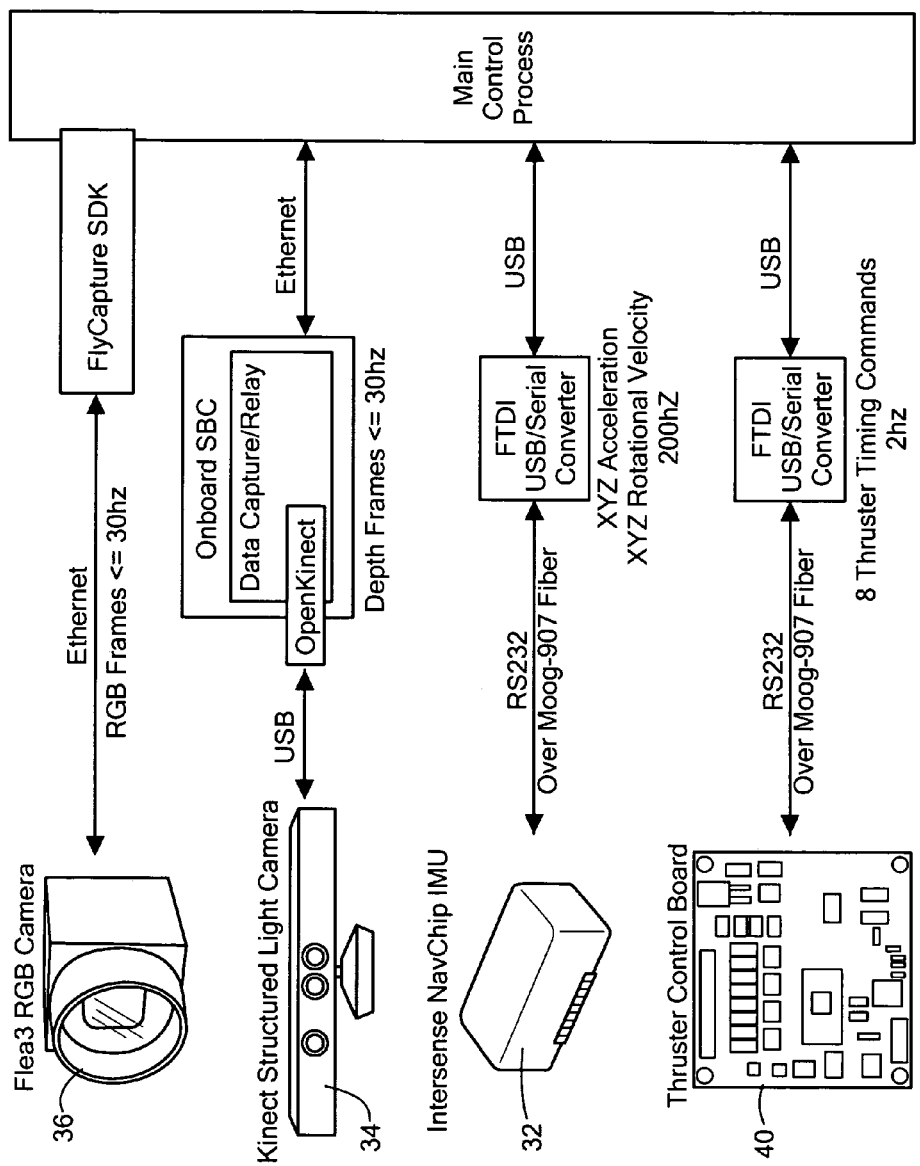
FIG. 22 is a block diagram showing the various data streams presented to the command module.
Figure 24:
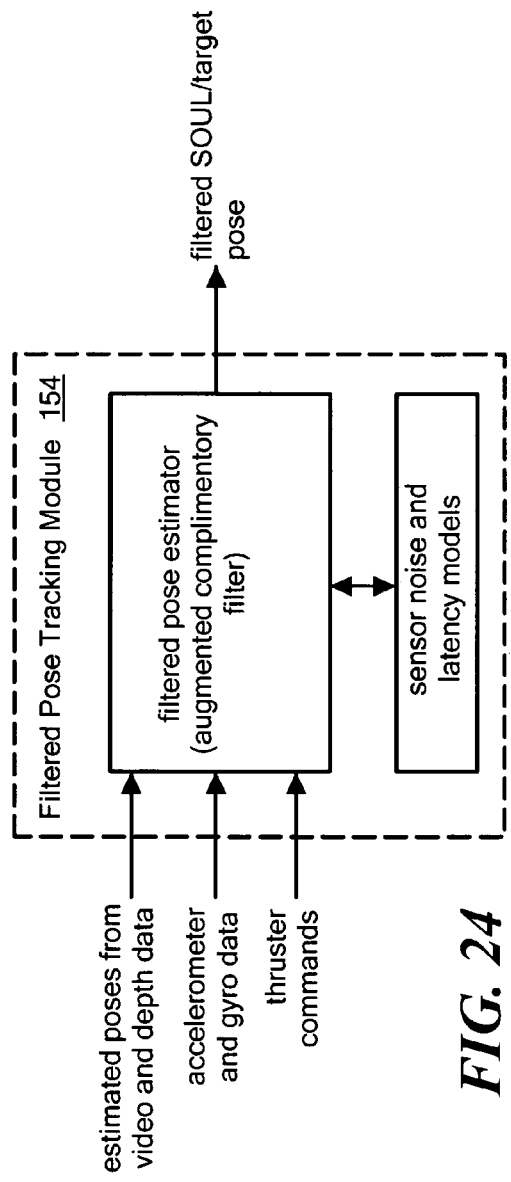
FIG. 24 is a view of the filtered post tracking module of FIG. 23.

The filtered pose tracking module 154, FIGS. 22 and 24 is responsible for integrating the pose estimates from the vision modules with data from the IMU and other sources.

The robot system has access to several sources of information related to position and motion: solid state accelerometers and gyroscopes, camera based information, and thruster timings. The goal of the filtered pose tracking module is to combine all sources of information into an estimate of robot's 3D position and velocity.

Figure 25:
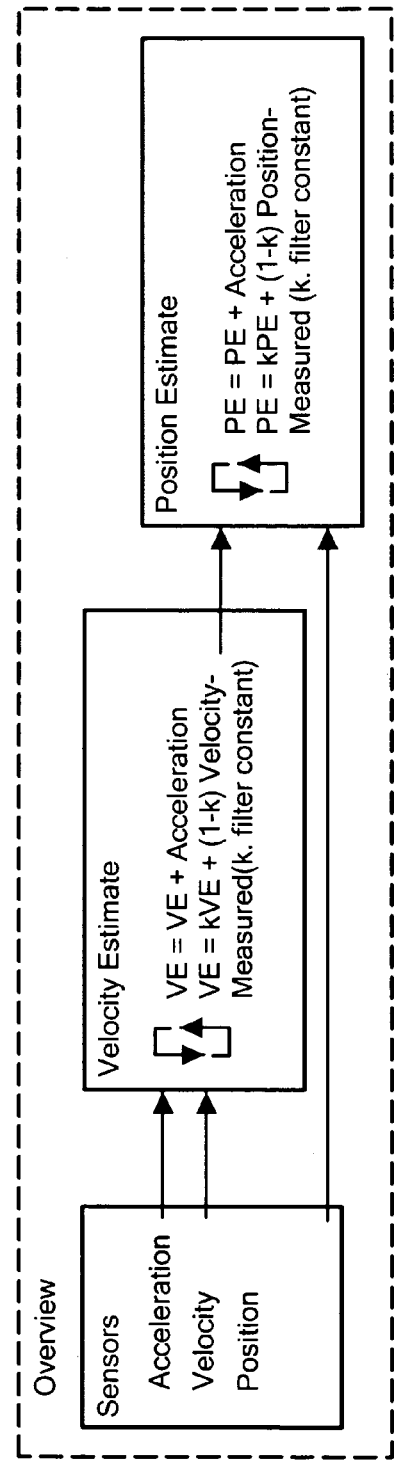
FIG. 25 is a block diagram showing a filter network.

The system may operate as a network of complementary filters as shown in FIG. 25. These filters work to provide an estimate of a value by combining sensor data that measures a value with sensor data that measures relative changes in that value. The position estimate is constantly updated by moving it according to the velocity estimate and the time that has passed. In this way, noisy but unbiased position information (from the cameras) can be heavily filtered without causing temporal lag on the position estimate. In turn, the velocity estimate is constantly updated from the acceleration data—this similarly allows the noisy but unbiased velocity estimate from the cameras to be heavily filtered without causing temporal lag on the velocity estimate.

Note the sensors may have different delays, sensor buffering (many accelerometer readings at once may be received, given its high speed), sensor clock mismatch (accelerometer has its own clock), velocity updates depend on orientation (local frame of accelerations vs. global frame for velocity) and multiple sources of same types of data (thruster based prediction competes with accelerometer).

Figure 26:
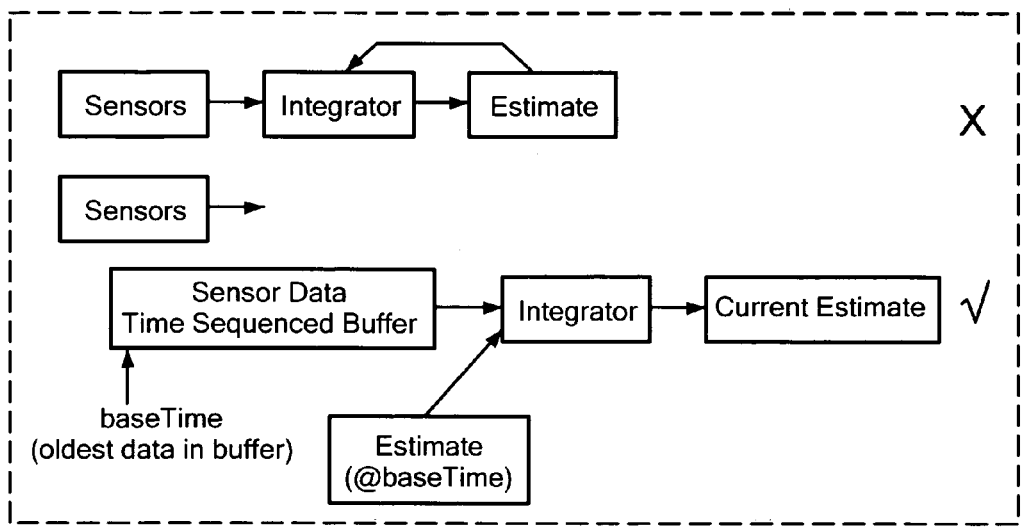
FIG. 26 is a flow chart showing the primary steps associated with processing an incoming sensor signal.

To accommodate the temporal issues, instead of integrating incoming sensor data right away, the system as shown in FIG. 26 buffers recent data into data streams. This allows it to align the data according to known delays, instead of according to the time it is received. It also means that a current estimate can be produced immediately with all available information while still allowing delayed data to be inserted at the correct time in the past, providing more accurate estimates.

Figure 27:
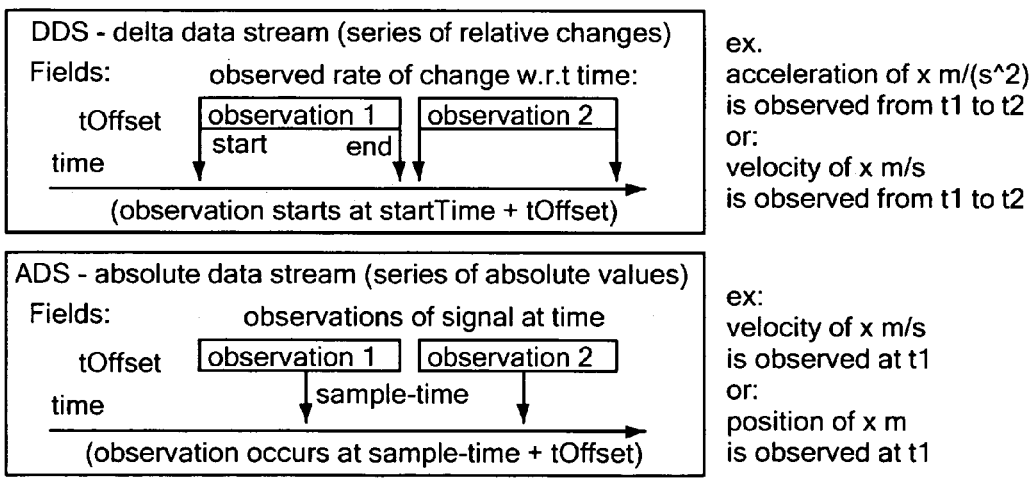
FIG. 27 shows delta data streams and absolute data streams.

The system is estimating four quantities: position, orientation, translational velocity, and rotational velocity. As shown in FIG. 27 each of these estimators can combine two kinds of data: incremental changes to the value (e.g., acceleration, which changes velocity, DDS below), and unbiased (but potentially noisy) observations of a value directly (e.g., position estimate from the camera, ADS below).

Each of these quantities employs an integrator to combine the information from the buffers and update the estimate. As old data is discarded from the buffers, that data is collapsed into the "baseEstimate" which stores the estimated value at some point in the past ("baseEstimateTime"). To get a later estimate of the value, (e.g., at the current time) the integrator starts from the baseEstimate and baseEstimateTime then integrates all the buffered data up to the desired estimate time as shown in FIG. 28.

Figure 29:
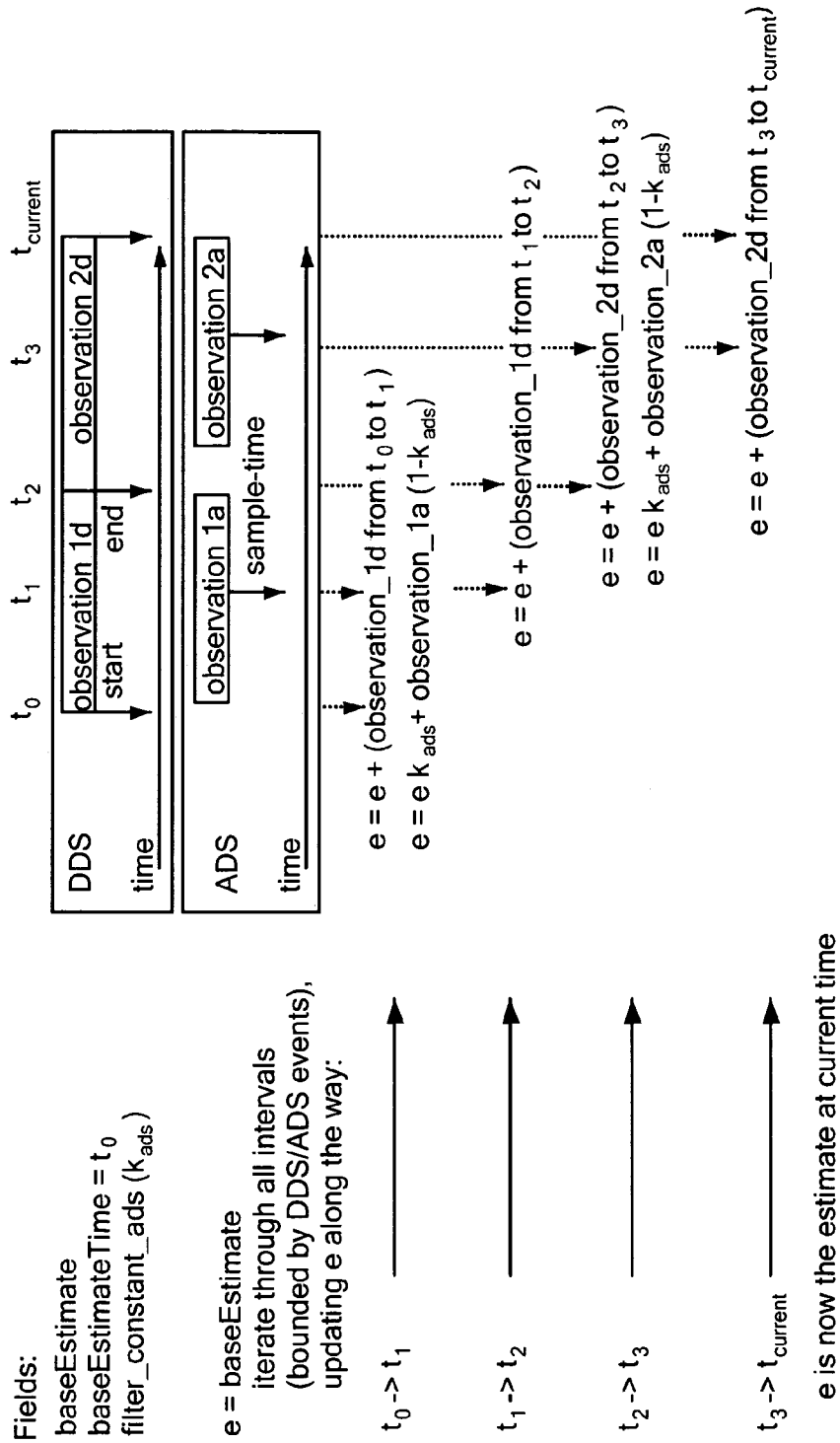
FIG. 29 shows an example of a stream integrator calculating a single, combined estimate.

FIG. 29 shows an example of a StreamIntegrator calculating a current time estimate by stepping through its cache of data, integrating each interval of data into its starting estimate. The StreamIntegrators for each quantity are not independent. The position estimators need accurate velocity estimates to function and the translational velocity estimator needs an accurate rotational position estimate to transform robot-relative accelerometer data. For these reasons, the system does not run each StreamIntegrator from baseEstimateTime through to currentTime individually, as shown in the above diagram; instead, it steps slowly forward in small time increments, updating each StreamIntegrator for that time increment only—this way its results can be used as necessary by the other StreamIntegrators. This process is shown in the "Get Estimate at time T" function below.

Figure 30:
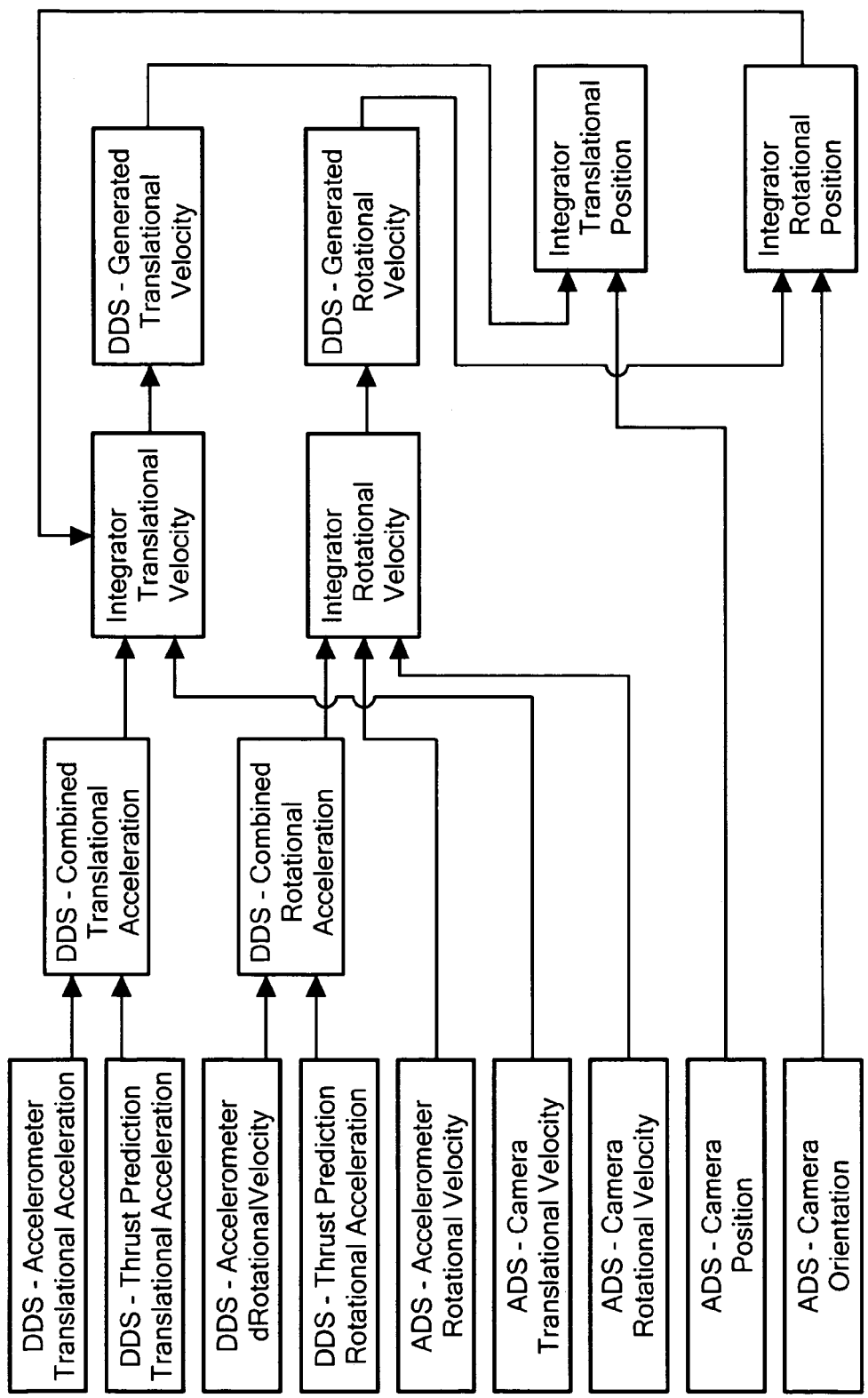
FIG. 30 is flow chart for the full filter network.
Figure 31:
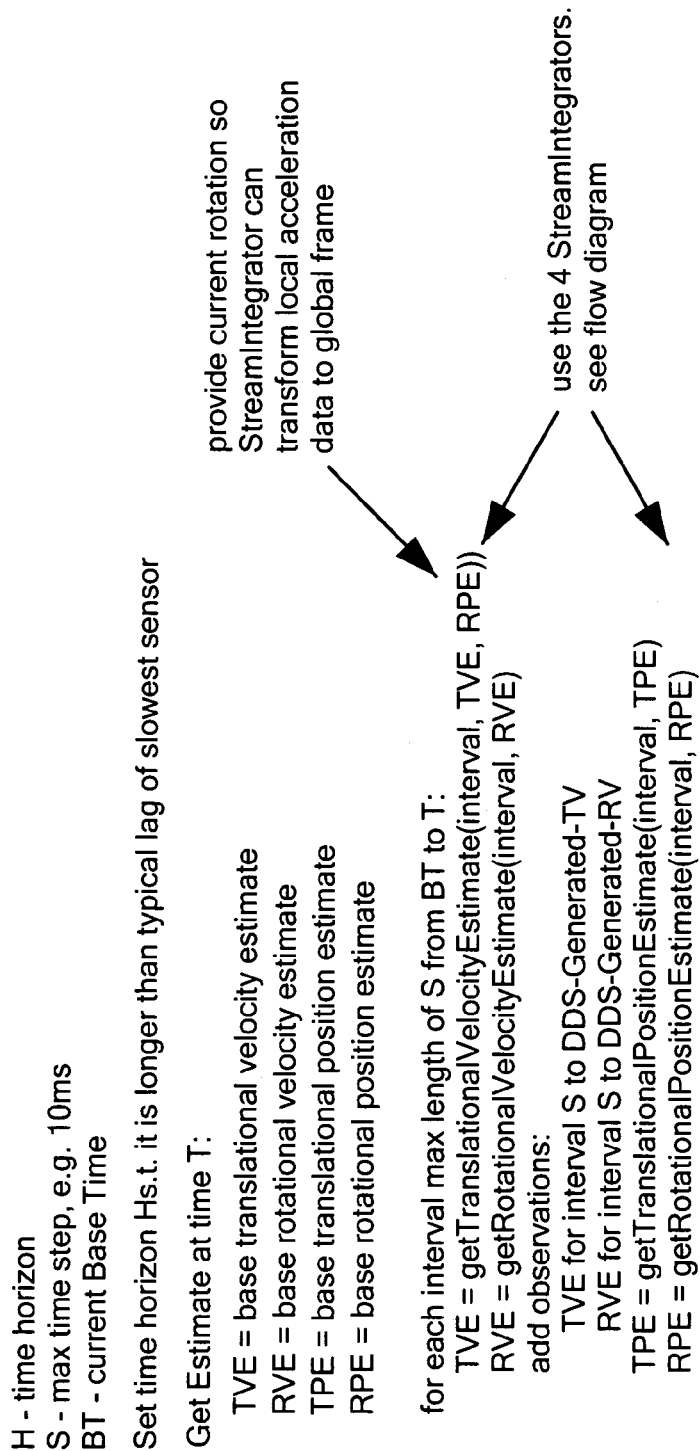
FIG. 31 shows exemplary programming for updating the four streaming integrators.

FIG. 30 shows the four integrators that are connected with the different sensory inputs. Note that the rotational position feeds back into the Translational Velocity integrator so it can convert the local frame accelerations into global frame velocities. The DDS streams for the position integrators are not directly connected to a delta-position sensor—instead, those streams are the result of the velocity StreamIntegrators. The process for stepping forward in time while updating the four StreamingIntegrators is described in FIG. 31.

Periodically, as the buffers exceed the length of the desired time horizon, old data is discarded and collapsed into the baseEstimates as shown in FIG. 32.

Two specializations of the DDS buffer are employed. The Combined DDS is used to combine two DDS streams, so they appear as one stream which is a weighted average of the two (e.g., to combine expected accelerations due to thruster action with measured accelerations from the accelerometer FIG. 33.

Figure 34:
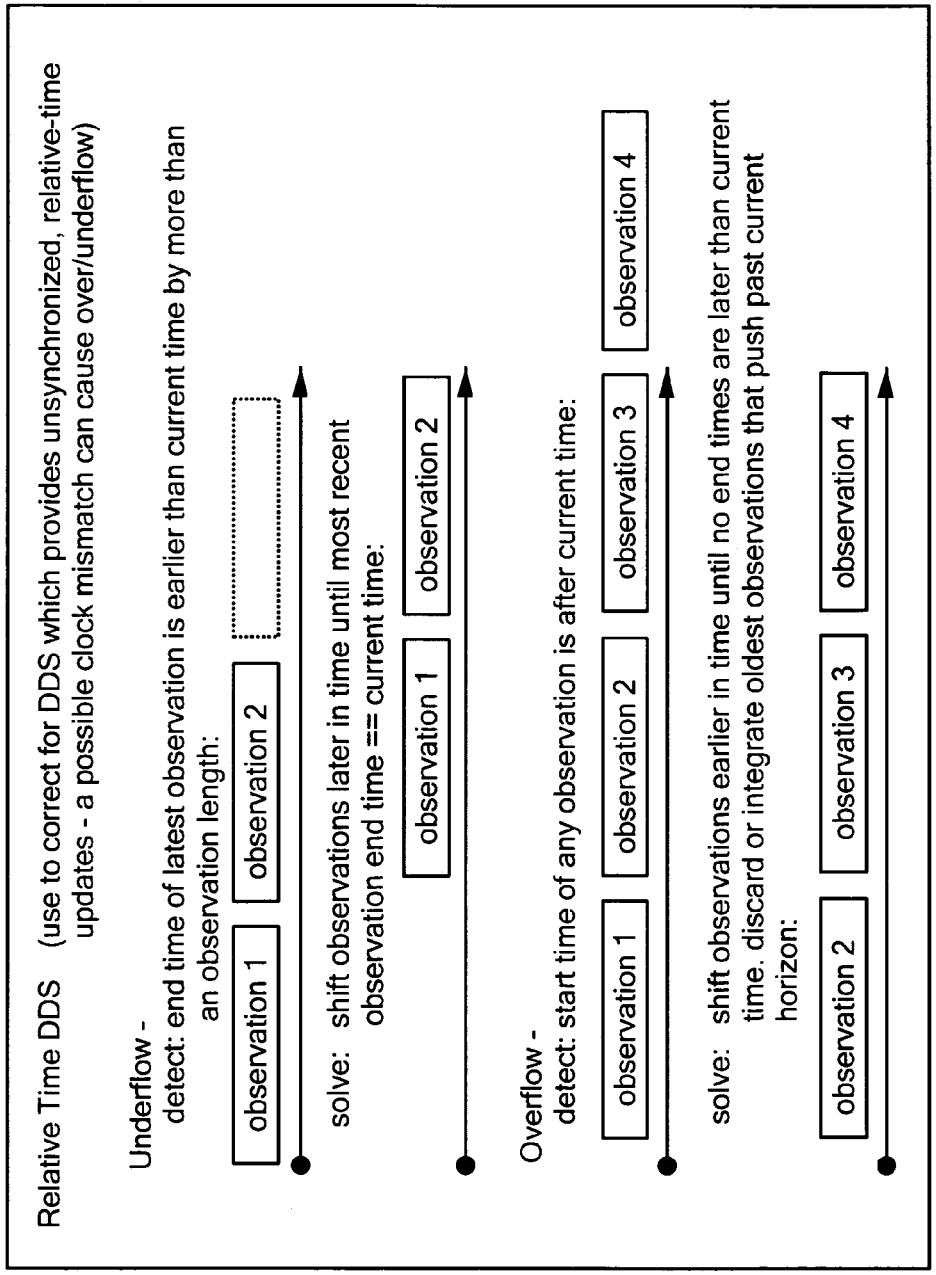
FIG. 34 shows a tool for relative time delta data streams correcting for drifts caused by unsynchronized clocks.

The Relative Time DDS, FIG. 34 is used to buffer data produced by a different clock and adjusts for clock mismatches that would otherwise result in buffer underflow/overflows.

Figure 35:
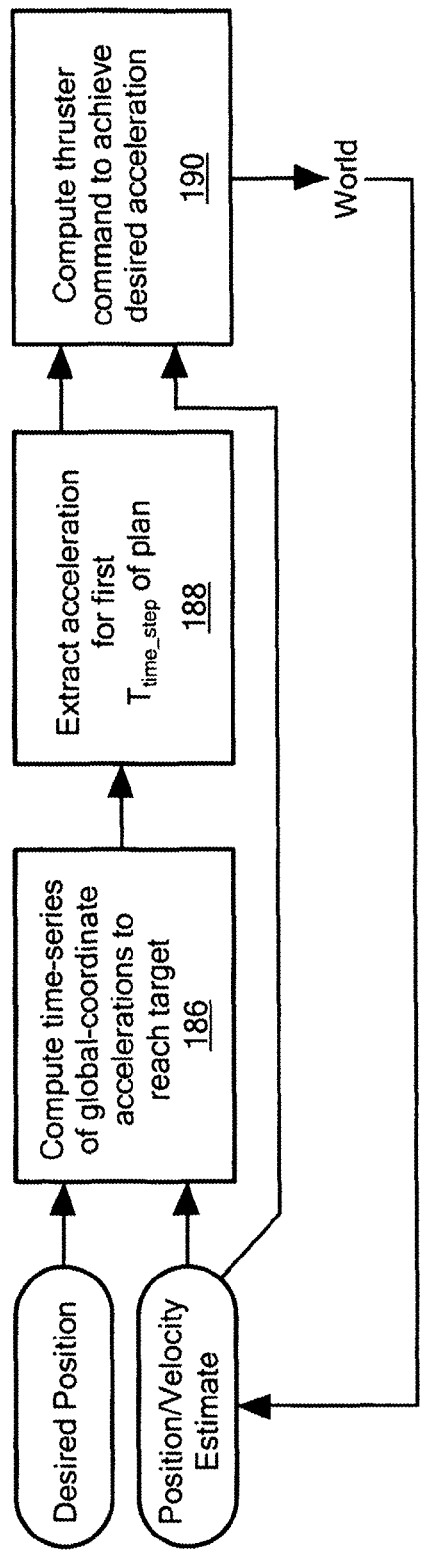
FIG. 35 is a flow chart depicting the primary steps associated with robot path planning and execution.

This section describes the software modules of the command module responsible for robot path planning and execution. A model-based controller is used to reach or hover at a desired target location. Given an estimate of current position and velocity, the system first computes, as shown at FIG. 35, a path to the desired target location, respecting acceleration and velocity limits, step 186. This path is in the "global" coordinate system (the coordinate system of the object/craft being observed). The system then examines the first part of the path step 188 and extracts the average accelerations occurring in this slice. These accelerations are then converted into a thrust command, step 190 to achieve this acceleration (this includes a conversion from global to robot space which relies on the estimate of the robot module's current rotation). The thrust commands are then sent to the thruster controller. This process is repeated at every opportunity to update robot's thrust command. The paths are designed such that the robot module always orients towards the target as it travels. The target is the only source of absolute position/velocity information, so keeping the target in sight is important for robot's localization.

For the robot, a path includes multiple sequences of accelerations, one sequence for each dimension. Given the current position and velocity, as well as the desired acceleration rate and maximum velocities, the path planning module computes these sequences such that robot ends up at the target position with zero velocity.

Figure 36:
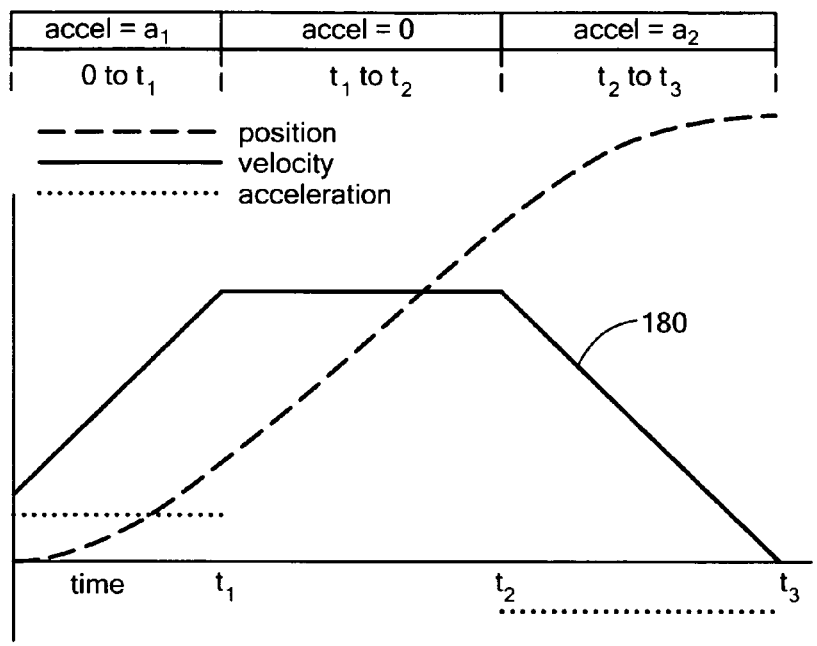
FIG. 36 is a graph showing a single dimension of a path plan.

As shown in FIG. 36, for each dimension, the paths are constrained to consist of no more than three periods of constant acceleration. The first and third intervals (a1 and a2) are equal and opposite (a1=−a2), while the second interval has zero acceleration. The acceleration a=a1 and the max-velocity are provided as constants—these are chosen based on the capabilities of the robot hardware and the desired speed of the robot's maneuvers. In some cases, one or more interval may be absent (or zero length); e.g., the middle section of zero acceleration may be absent if the maximum velocity is not achieved in a particular path.

Figure 37:
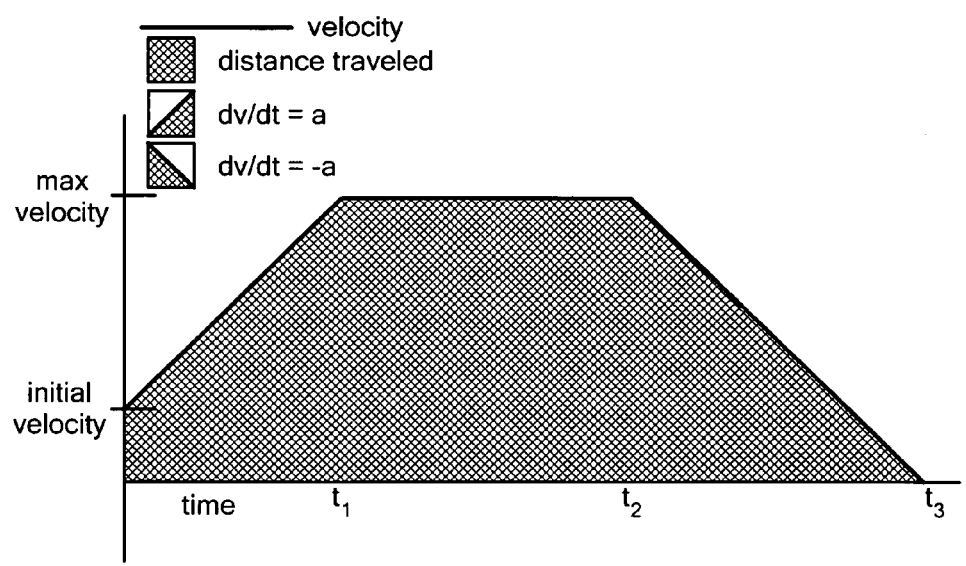
FIG. 37 is a diagram of the constraints used to solve for the times depicted in FIG. 36.

FIG. 37 illustrates the constraints used to solve for the time intervals that make up the path plan. Line 180 is defined by the robot module velocity with respect to time, is constrained in the following ways: the height cannot exceed max-velocity, the final velocity at t3 is zero, the slope from 0 to t1 is a, the slope from t1 to t2 is 0, the slope from t2 to t3 is −a, the velocity at time zero is initial-velocity, and the area under the velocity curve is the distance to the target.

Figure 38:
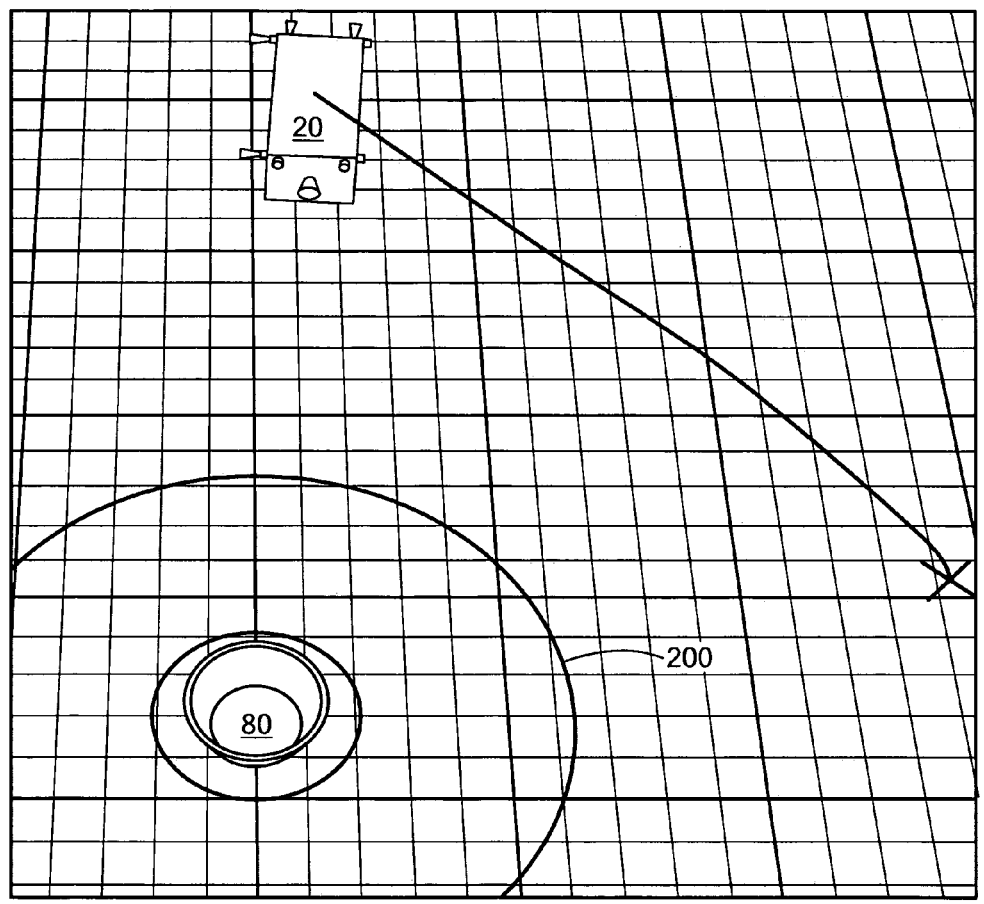
FIG. 38 is a view of a robot depicting a planned path proximate a target.
Figure 39:
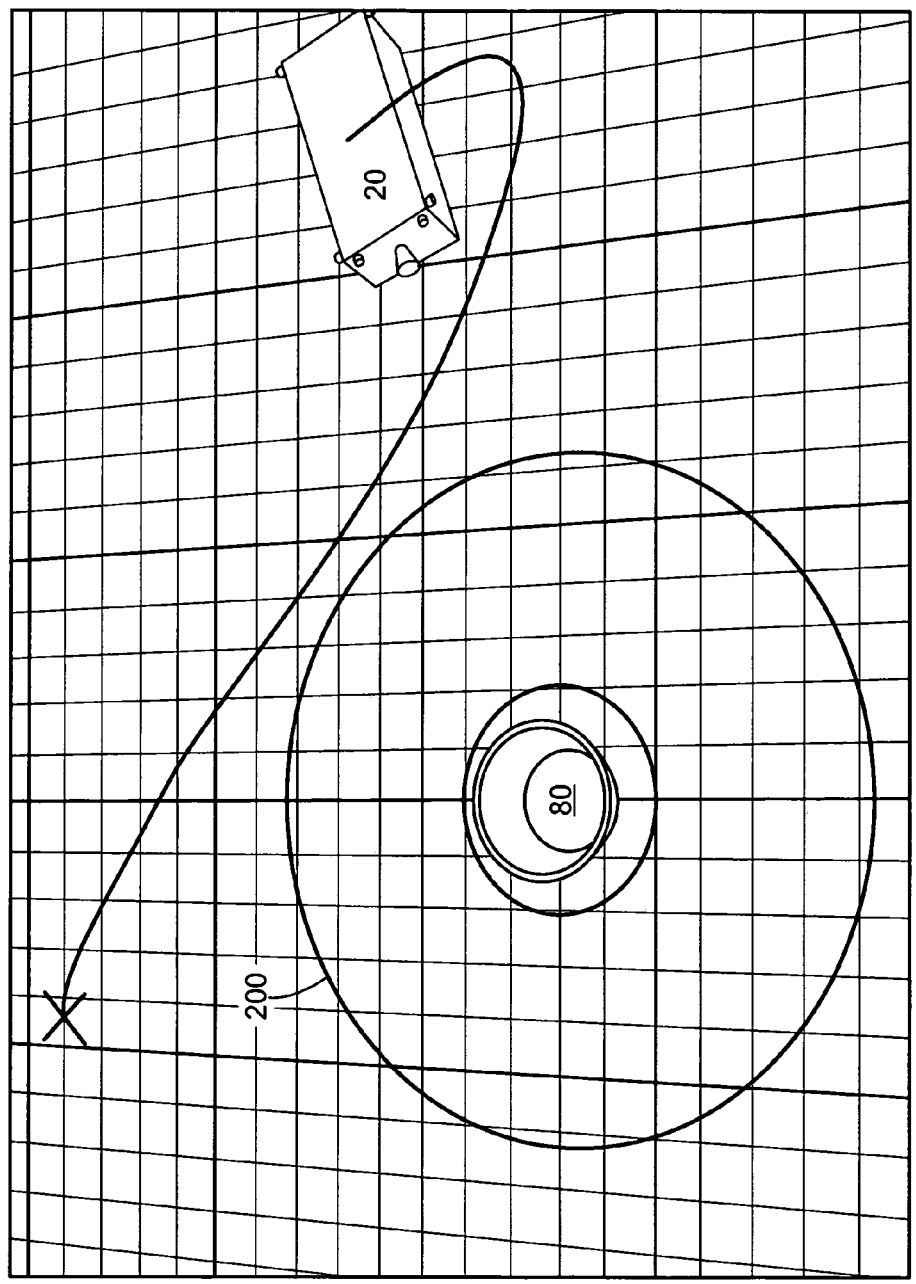
FIG. 39 is a view of the robot now at the first way point and planning a path to a second way point.
Figure 40:
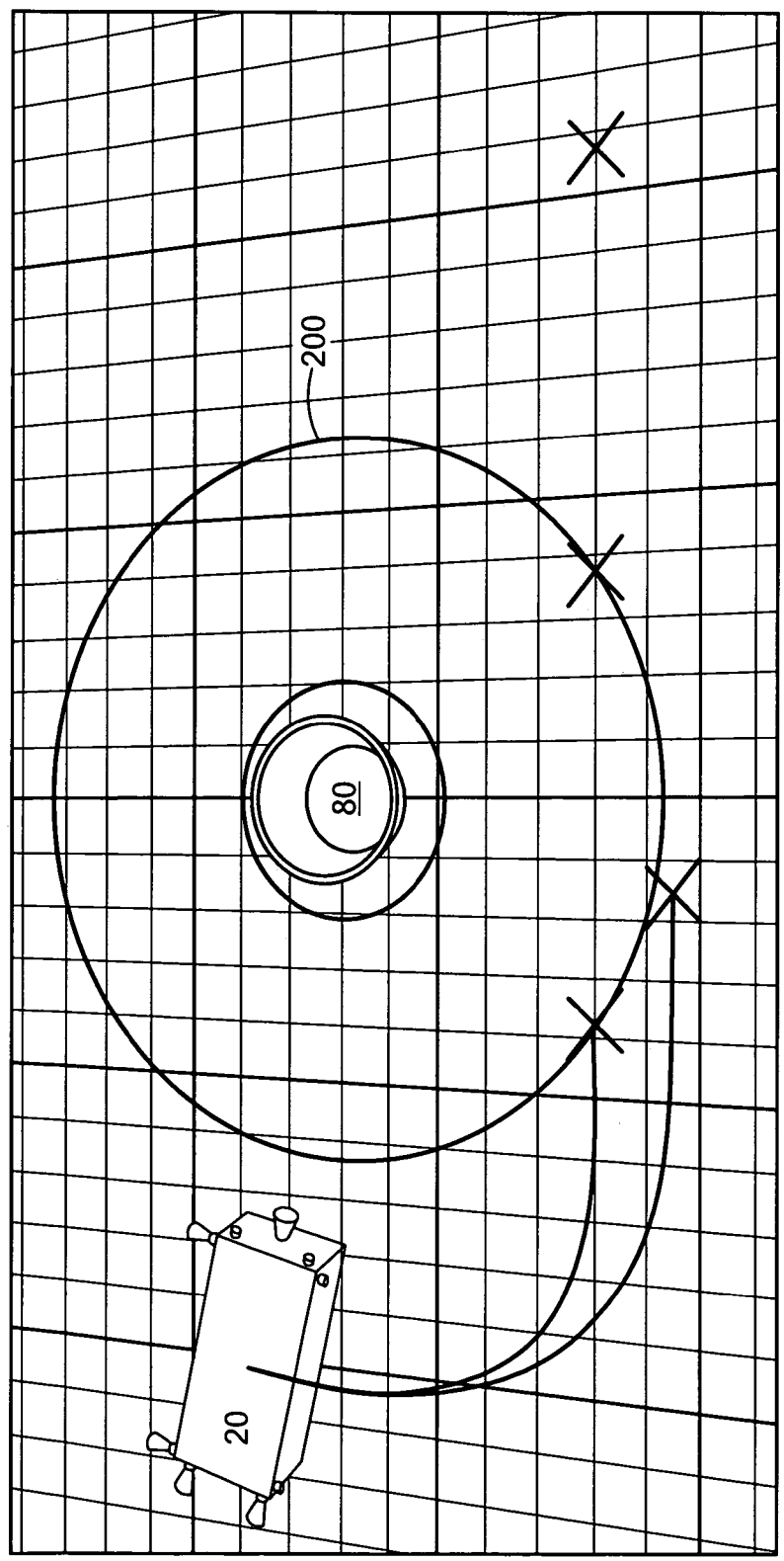
FIG. 40 is a view of the same robot at the second way point and now planning a path to a third way point.

These constraints fully define the shape, and thus by entering the initial-velocity and distance to target we can determine t1, t2, and t3 which define the path. When the dimensions are combined they define a multidimensional path through space. FIGS. 38-40 show the target 80 and a projected path.

When robot is retargeted while having a non-zero velocity, this velocity must be accounted for as part of the new path FIG. 39 shows the robot module heading up and to the left while starting with an initial down-right velocity.

The outer ring 200 around the simulated target object indicates the minimum desired standoff distance for the robot module. If a path heading directly to the target would cause robot to enter this area, the path planning system will introduce intermediate targets that direct the path outside this boundary.

Figure 41:
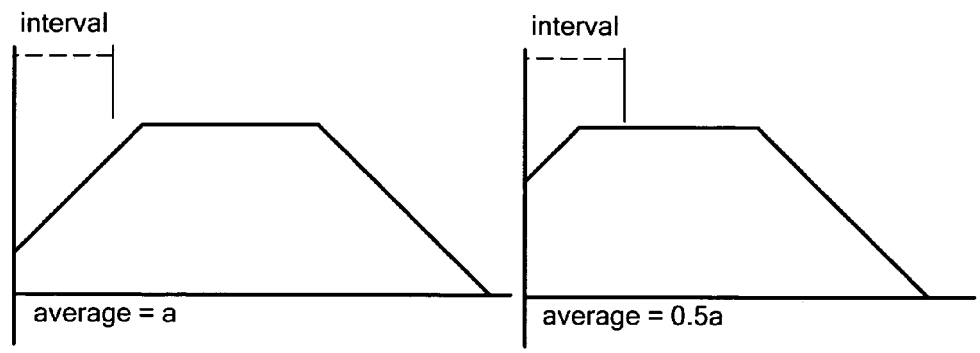
FIG. 41 is a graph showing how path plans are evaluated over an update interval to determine acceleration.

Commands are computed and sent to the thrusters at a fixed time interval. Because commands will last throughout this fixed interval, the path execution module does not use the instantaneous acceleration described by the path plan; instead, for each dimension it takes the average of the acceleration described over the desired time interval as shown in FIG. 41.

The robot module's thrusters are each individually fully on or fully off, so a desired acceleration direction may be achieved by firing each thruster for different lengths of time. The thrusters are commanded at a fixed interval (every 500 ms); the command tells each thruster how long to fire during that interval (frequently many of the thrusters are completely off).

Figure 42:
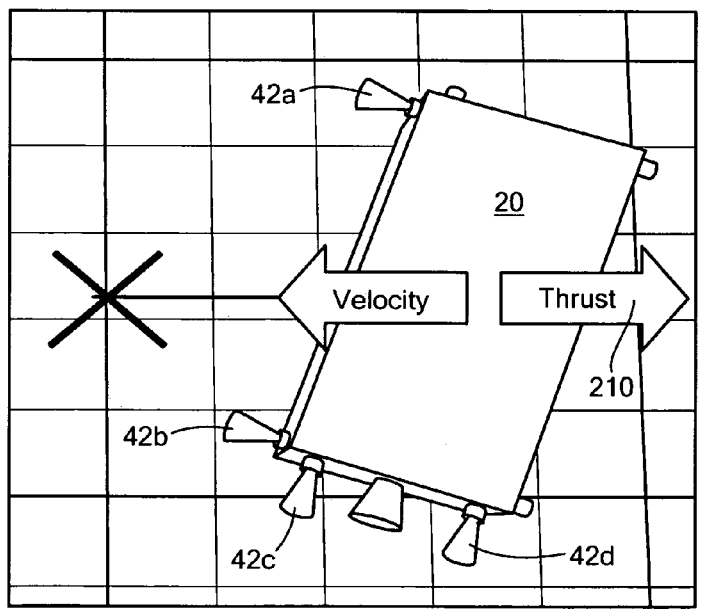
FIG. 42 is a view of the robot showing firing of multiple thrusters as the robot approaches a target way point.

For example, in FIG. 42, the robot module is decelerating as it approaches the target so it is attempting to apply an acceleration along the arrow 210. To achieve this, thrusters 42a and 42b will be firing significantly (e.g., 400 ms of the 500 ms cycle) while thrusters 42c and 42d will only need to fire for a short time (e.g., 50 ms of the 500 ms cycle) to counteract the slight downward component of a and b.

In addition to the trajectory generation mechanisms described above, the path planning 153, FIG. 21 and execution 155 modules also provide support for a "lost in space" motion controller. The lost-in-space routine is designed for situations where the vision-based tracking modules have been unable to provide a pose estimate for a significant period of time—for example, if the target object has moved out of the field of view of the on-board cameras—thus depriving robot of any absolute localization data.

The lost-in-space algorithm may use as input only the angular velocity estimate provided by the onboard gyroscopes, ignoring all other estimates of system position and velocity. The algorithm computes thruster commands so as to maintain a small, constant angular velocity. This causes the robot module to slowly scan the local environment for a trackable target. If and when tracking data is re-acquired by any of the vision-based tracking modules, the lost-in-space behavior terminates, thus returning the system to normal operation.

Figure 43:
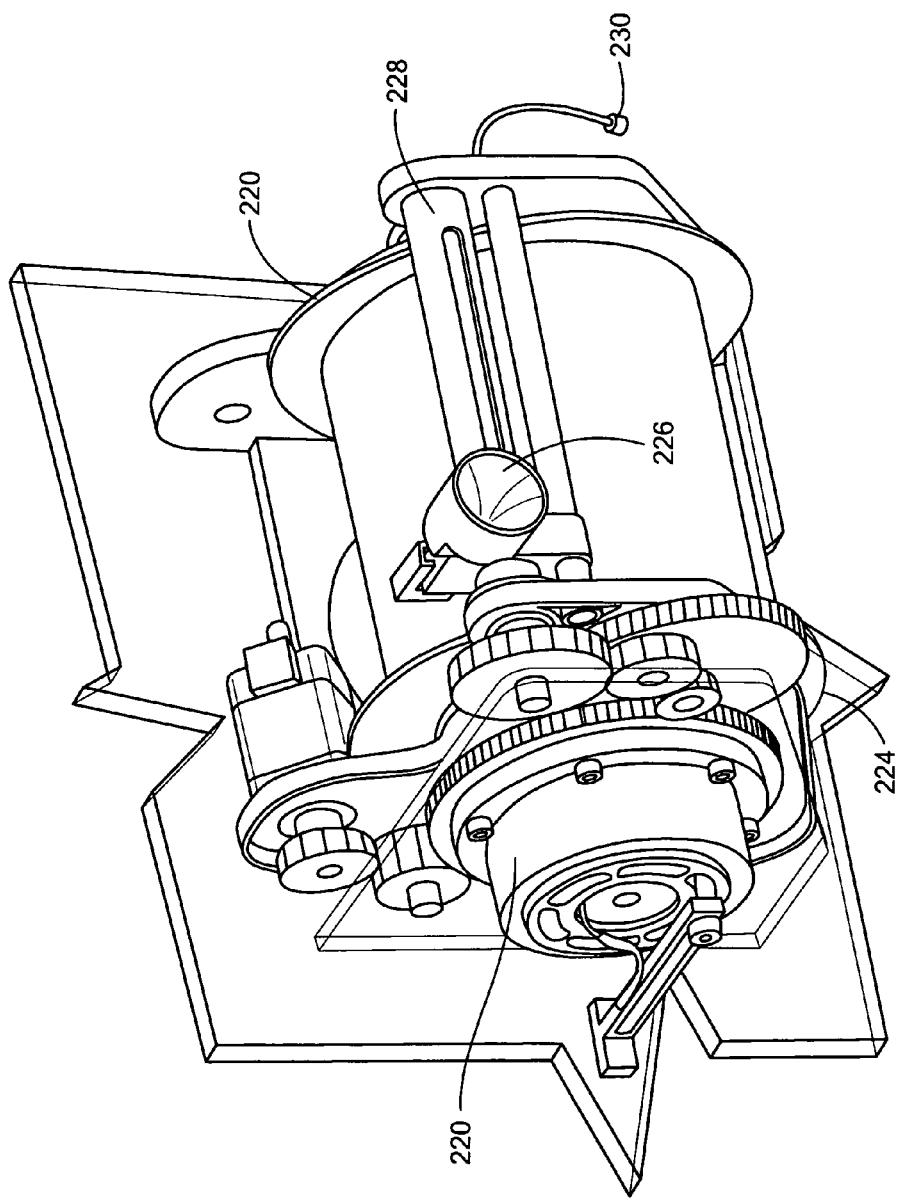
FIG. 43 is a front schematic view showing the primary components associated with one preferred umbilical line winch.
Figure 44:
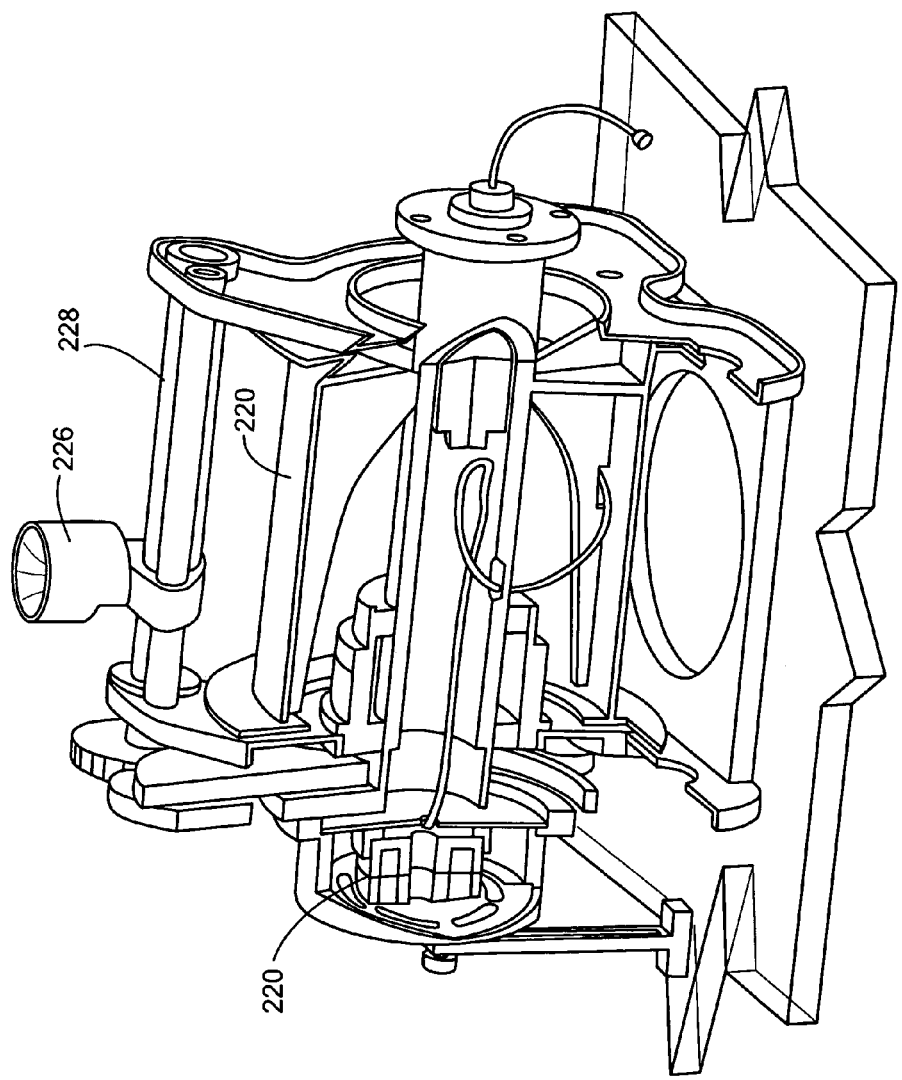
FIG. 44 is another schematic view showing the inside of the winch drum of FIG. 43.
Figure 45:
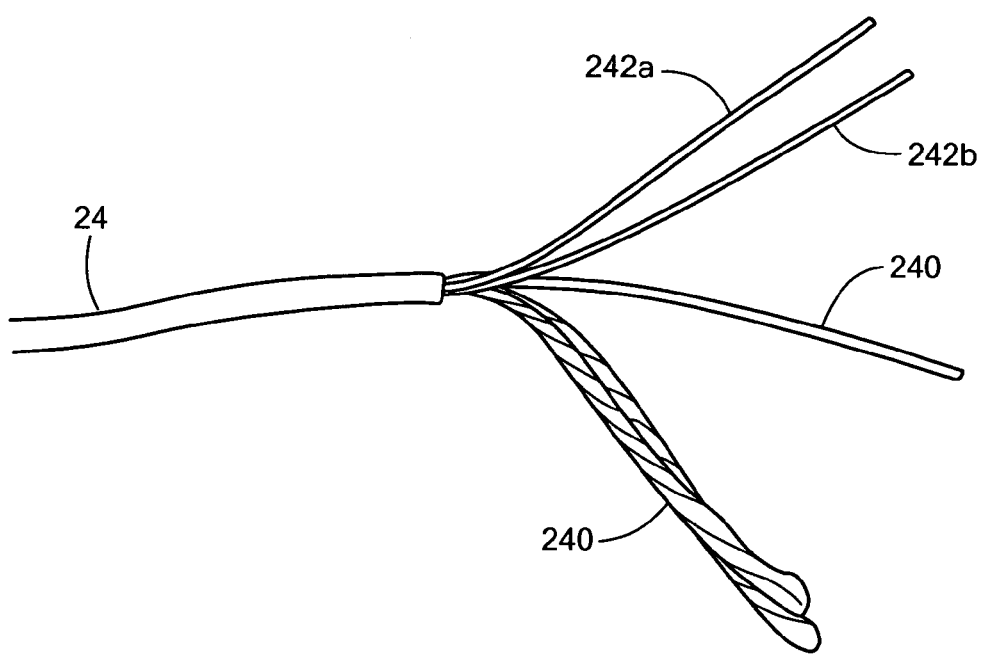
FIG. 45 is a view showing the primary components associated with one preferred umbilical line used in connection with the winch shown in FIGS. 43-44.

Preferably, the host platform includes the command module and robot dock(s) which in turn contains a winch (FIGS. 43-44) and umbilical line (FIG. 45). The winch pans out the umbilical line and rewinds it as needed depending on the path of the robot. It must also facilitate transportation of power and telemetry across rotating interface. A rotary transformer 220 is employed for power transportation. The rotary transformer transfers ~100 W without using brushes that could cause uncontrolled friction and skew force/torques measurements. A Rotary fiber optic joint which is commercially available transmits bidirectional data/telemetry.

The winding drum 222 diameter is determined by the minimum bedding radius of the optical fiber which was taken as 30 mm. This plus 15 mm margin yielded 3" drum diameter. A 100 m long umbilical line that is approximately 2 mm in diameter should fit on the drum that is approximately 3" long with 0.5" fences. Rotary transformer 220 rotates drum 220 via gear train 224. Cable guide 226 slides back and forth on guide mechanism 228. The fiber optics inlet with a rotary joint is shown at 230.

The robot's umbilical design includes several possible design choices. Options include wireless RF communications (freeing this task from the umbilical), a copper wire link, or a fiber optic communication link. That left fiber optics or physical wire such as the Ethernet cable because of its ability to deliver power in addition to data.

A preferred umbilical design includes selecting optic fiber 240, FIG. 45 for data transfer. The complete umbilical design adds two copper conductors 242a and 242b for high voltage DC power transfer, a Kevlar bundle 244 for towing capacity, and a protective outer jacket. A third copper wire may be added in the future for grounding/connecting the outer skin of the robot to the host platform. The copper wire was sized to transmit 100 W at 300V dropping no more than 5V over 100 m. This resulted in current density of ~200 A/cm2 which is a typical number in confined bundled wires and coils in terrestrial applications.

The Kevlar fiber was sized assuming that the typical GEOsat apogee motor has thrust of 400N and that the line should not imposed greater loads on the debris than the apogee motor. Further assuming that the typical Kevlar tension strength is 3.6E09 Pascal yields Kevlar diameter about 0.5 mm in diameter. The 400N provides ample margin for the anticipated electric propulsion on the mother ship that will tow the debris to disposal point. Typical Hall thruster delivers 66 mN/kW of input power, so even high power EP is unlikely to deliver more than 1N.

The OD of the umbilical cable is preferably 0.137" (3.5 mm). This is nearly double of what it could be if the fiber optics line was bear prior to its encapsulation into the umbilical line. Encapsulating bare fiber into such cable would however require special processes. In-space orbital debris removal applications will demand a smaller diameter to limit the size of the winch with a 100 m long cable.

The perch-and-stare demonstration allows an operator to specify, via a graphical interface on the control PC, a desired position for the SOUL module relative to a target object.

Once the desired position is specified, the SOUL module attempts to navigate to the desired position, and then attempts to maintain this position against external perturbation. At all times, the SOUL module attempts to maintain its orientation such that its camera is pointed directly at the target object.

The perch-and-stare mission may use either the marker-based tracking module or the point cloud-based tracking module for object tracking. The mission depends upon the correct, coordinated operation of many of the components of the full robot hardware and software system, including the filtered pose estimation module, the path planning module, and the path execution module. Thus the perch-and-stare software comprises a true end-to-end demonstration of the integrated robot system.

In another mission the robot approaches an initial waypoint, using a marker for localization. Then, robot rotates to face its next mission waypoint, smoothly switching to point cloud-based pose estimation as its target object (thruster cone) comes into view, robot then moves in closer to its target object, navigating until it attains a desired viewing angle before retreating to its final waypoint. The demonstrations also highlighted robot's "lost in space" search behavior. In the absence of reliable localization data, the lost-in-space behavior could be triggered, causing robot to slowly rotate at a constant angular velocity until either the marker or metal bucket swung into view. Once the target object was acquired successfully by the relevant vision-based tracking module, the rotational search was terminated, and robot could proceed as normal to its target mission waypoint.

In another mission, robot holds its position in response to external perturbations. The robot module can re-obtain its position following substantial disturbances, including relatively dramatic angular displacements.

For another mission, the robot module makes controlled, physical contact with a target object while imparting minimal momentum to the target. A custom tactile sensor is added to the robot, and a touch-and-go control behavior is added to the existing path planning module.

A probe may be constructed out of a long, thin, plastic tube. Holes may be drilled out along the length of the tube to reduce mass while maintaining stiffness. The probe can be mounted to the front face of the robot module via 3D sensor such as the 3Dconnexion SpaceNavigator. The SpaceNavigator, typically used as a 3D mouse input device, uses sensitive optical encoders to measure angular and linear displacements along six axes of motion.

To capture the deflection data, the SpaceNavigator is connected to the on-board Aurora SBC via USB. A grabber process on the SBC captured the 6-DOF displacement measurements. The measurements were then relayed to the main control PC via Ethernet using an ad hoc, UDP-based data streaming protocol. On the control PC, a deviation-from-baseline metric can be used to detect contact with the probe. A moving average was computed based on the incoming 6-DOF measurements. If a new, incoming measurement deviated significantly from this moving average, a contact signal is generated. This contact signal could then be used as input for the touch-and-go navigation control behavior.

Also a new navigation control behavior is added to the path planning module. The touch-and-go behavior made use of the existing mission waypoint navigation system featured in the integrated system demonstrations.

When the touch-and-go behavior is initiated, it first generates a mission waypoint for the robot module at a close but safely non-colliding distance from the target object: the "observation" waypoint. Once robot has come to a stop at the observation waypoint, the system plots a straight-line path from the waypoint to the target. A new waypoint is generated along this linear path, at a distance from the target that is slightly less than the length of the touch probe: the "contact" waypoint. The robot module is then directed toward this contact waypoint at a very low maximum velocity. If and when contact is detected by the tactile sensor, the contact waypoint is abandoned, and the robot module is re-targeted back to the observation waypoint. The module retreats at a configurable maximum velocity to the observation waypoint, and the touch-and-go behavior completes.

In one test, a delicate paper towel was used as the target demonstrating minimal momentum transfer. The robot module was able to make contact with the target surface without damaging it and without transferring significant momentum to the target. The robot module successfully detected contact with the target via the tactile sensor and returned to the observation waypoint to complete the touch-and-go mission.

In testing, the robot software and hardware systems were successfully integrated to demonstrate many different capabilities, such as localization by both marker-based and point cloud-based tracking, perch and stare behaviors, holding position despite external perturbations, responding to a lost-in-space scenarios, and touch-and-go behaviors.

For the perch and stare behavior, an operator defines a waypoint and the robot navigates to the desired position and attempts to maintain its position against external perturbation. In a lost in space scenario, the target object(s) move completely out of the robot's view, depriving robot of any absolute localization data. The robot responds by automatically rotating and scanning the environment for a target, reacquires a target, and continues normal operation. Also, the robot is able to maintain a holding position despite substantial external perturbations.

The robot vehicle is preferably designed with the following goals in mind. Modularity: the robot is designed to accept electronics boards dimensioned to comply with the PC-104 standard. This allows for simple installation of COTS PC-104 devices, such as the fiber optic multiplexer and single board PC. Easy Disassembly: the robot is designed for easy disassembly and access to internal electronics, sensors, and mechanical components. Lightweight structure: the robot utilizes a lightweight fiberglass and aluminum structure. The low weight ensures reliable air bearing operation, resolving inconsistent air bearing performance issues with previous heavier designs. Internal nitrogen tank: the robot accommodates a large nitrogen tank, typically allowing for at least 40 minutes of intensive use before requiring refilling. Single umbilical interface: All data and power are provides via the umbilical reducing external forces on the robot and closely resembling a flight design in this respect.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A spacecraft system comprising:
   a platform including a dock and an umbilical payout device;
   a robot connected to an umbilical paid out by the umbilical payout device and deployable from said dock and including:
   one or more imagers,
   an inertial measurement unit, and
   a plurality of thrusters; and
   a command module receiving image data from the one or more robot imagers and orientation data from the inertial measurement unit and including:
   an object recognition module configured to recognize one or more objects from the received image data,
   determine the robot's orientation with respect to an object, and
   issue thruster control commands to control movement of the robot based on the robot's orientation.

2. The system of claim 1 in which the command module is onboard the platform and image data and orientation data is transmitted from the robot to the platform via the umbilical and thruster control commands are transmitted from the platform to the robot via the umbilical.

3. The system of claim 1 in which the platform is a satellite.

4. The system of claim 1 in which the robot further includes an end effector.

5. The system of claim 1 in which the robot further includes a probe.

6. The system of claim 1 in which the command module is configured to issue thruster control commands which move the robot closer to said object.

7. The system of claim 1 in which said command module is configured to issue thruster control commands which reposition the robot at a previously determined location.

8. The system of claim 1 in which the object recognition module is configured to recognize one or more objects based on stored image data.

9. The system of claim 1 in which the object recognition module includes a marker based tracking module and/or a point cloud based module.

10. The system of claim 1 in which the one or more imagers include a depth camera, an infrared camera, and/or an RGB camera.

11. The system of claim 1 in which the command module is configured with a path planning module and path execution module configured to plan and execute movement of the robot.

12. The system of claim 11 in which the path planning module is configured to plan a path which keeps the robot at a specific orientation with respect to the object.

13. The system of claim 11 in which the path planning module is configured to plan a path which keeps the robot at a specified distance from the object.

14. The system of claim 11 in which the path planning module is configured to plan a path of movement for the robot based on both image data and orientation data from the inertial measurement unit.

15. The system of claim 1 further including means for damping the umbilical.

16. A method comprising:
deploying a robot from a platform dock in space using an umbilical wound about an umbilical payout device associated with the dock;
at the robot, generating image data and orientation data;
processing the image data to recognize one or more objects imaged by the robot;
processing the orientation data to determine the robot's orientation with respect to a recognized object; and
issuing thruster control commands to control movement of the robot based on the image and orientation data.

17. The method of claim 16 in which the image data and orientation data is transmitted from the robot to the platform via the umbilical and thruster control commands are transmitted from the platform to the robot via the umbilical.

18. The method of claim 16 in which the platform is a satellite.

19. The method of claim 16 further including equipping the robot with an end effector.

20. The method of claim 16 further including equipping the robot with a probe.

21. The method of claim 16 in which the thruster control commands are configured to move the robot closer to said object.

22. The method of claim 16 in which the thruster control commands are configured to reposition the robot at a previously determined location.

23. The method of claim 16 in which recognizing one or more objects is based on stored image data.

24. The method of claim 16 in which the object recognition include marker based tracking and/or a point cloud based tracking.

25. The method of claim 16 in which generating image data includes using a depth camera, an infrared camera, and/or an RGB camera.

26. The method of claim 16 in which issuing thruster control commands includes path planning and path execution configured to plan and execute movement of the robot.

27. The method of claim 26 in which path planning includes planning a path which keeps the robot at a specific orientation with respect to the object.

28. The method of claim 26 in which path planning includes planning a path which keeps the robot at a specified distance from the object.

29. The method of claim 26 in which path planning includes planning a path of movement for the robot based on both image data and orientation data.

30. The method of claim 16 further including damping the umbilical.

31. A spacecraft system comprising:
a platform including a dock and an umbilical payout device;
a robot connected to an umbilical paid out by the umbilical payout device and deployable from said dock and including:
a depth camera, an infrared camera, and an RGB camera,
an inertial measurement unit, and
a plurality of thrusters; and
a command module onboard the platform receiving, via the umbilical, image data from said cameras and orientation data from the inertial measurement unit and including:
an object recognition module configured to recognize one or more objects from the received image data,
determine the robot's orientation with respect to an object, and
issue thruster control commands to control movement of the robot based on said image data and the robot's orientation.

* * * * *